United States Patent
Harris et al.

(10) Patent No.: US 11,214,515 B2
(45) Date of Patent: Jan. 4, 2022

(54) GLASS-BASED ARTICLES HAVING STRESS PROFILES WITH HIGH STORED ENERGY AND METHODS OF MANUFACTURE

(71) Applicant: CORNING INCORPORATED, Corning, NY (US)

(72) Inventors: Jason Thomas Harris, Horseheads, NY (US); Kevin Barry Reiman, Horseheads, NY (US); Rostislav Vatchev Roussev, Painted Post, NY (US); Ross Johnson Stewart, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 288 days.

(21) Appl. No.: 16/204,348

(22) Filed: Nov. 29, 2018

(65) Prior Publication Data

US 2019/0161402 A1    May 30, 2019

Related U.S. Application Data

(60) Provisional application No. 62/592,708, filed on Nov. 30, 2017.

(51) Int. Cl.
*C03C 21/00* (2006.01)
*C03B 27/03* (2006.01)
(Continued)

(52) U.S. Cl.
CPC ............ *C03C 21/002* (2013.01); *B32B 17/06* (2013.01); *C03B 23/203* (2013.01); *C03B 27/03* (2013.01);
(Continued)

(58) Field of Classification Search
CPC ................................................ B32B 17/10137
See application file for complete search history.

(56) References Cited

U.S. PATENT DOCUMENTS 3,746,526 A * 7/1973 Giffon .................... C03B 23/20
65/121
3,765,855 A * 10/1973 Larrick .................. C03C 21/00
65/30.14

(Continued)

FOREIGN PATENT DOCUMENTS

WO      2017177109 A1    10/2017

OTHER PUBLICATIONS

Barsom, "Fracture of Tempered Glass;" Journal of the American Ceramic Society 51(2), 1968, pp. 75-78.
(Continued)

*Primary Examiner* — David Sample
(74) *Attorney, Agent, or Firm* — Kevin M. Johnson

(57) ABSTRACT

Glass-based articles having defined stress profiles and methods for manufacturing such glass-based articles are provided. A non-limiting glass-based article comprises an outer region extending from the surface to a depth of compression, wherein the outer region is under a neutral stress or a first compressive stress, a core region under a second compressive stress, the second compressive stress defining a compression peak having a maximum compression value and a maximum width at zero stress in a range of from about 1 micrometer to about 200 micrometers, and an intermediate region disposed between the surface and the core region, wherein the intermediate region is under a tensile stress.

21 Claims, 14 Drawing Sheets

(51) Int. Cl.
  *C03C 10/00*  (2006.01)
  *G06F 1/16*  (2006.01)
  *C03C 27/10*  (2006.01)
  *B32B 17/06*  (2006.01)
  *C03B 23/203*  (2006.01)
  *C03B 17/06*  (2006.01)
  *C03B 17/02*  (2006.01)

(52) U.S. Cl.
  CPC ............ *C03C 27/10* (2013.01); *G06F 1/1637* (2013.01); *C03B 17/02* (2013.01); *C03B 17/064* (2013.01); *Y10T 428/249921* (2015.04); *Y10T 428/249969* (2015.04); *Y10T 428/26* (2015.01)

(56) References Cited

U.S. PATENT DOCUMENTS

| | | | |
|---|---|---|---|
| 3,958,052 A * | 5/1976 | Galusha | ................ C03B 23/203 428/68 |
| 9,522,836 B2 | 12/2016 | Gulati et al. | |
| 2004/0142811 A1 | 7/2004 | Torr et al. | |
| 2012/0328843 A1 * | 12/2012 | Cleary | .............. B32B 17/10137 428/174 |
| 2013/0236666 A1 | 9/2013 | Bookbinder et al. | |
| 2014/0093702 A1 * | 4/2014 | Kitajima | ............. C03B 23/0252 428/174 |
| 2015/0158277 A1 * | 6/2015 | Fisher | ................. B32B 17/1077 156/102 |
| 2016/0137548 A1 | 5/2016 | Cabral, Jr. et al. | |

OTHER PUBLICATIONS

Gulati, "Frangibility of Tempered Soda-Lime Glass Sheet", Glass Processing Days, Sep. 13-15, 1997, pp. 72-76.

International Searching Authority Invitation to Pay Additional Fees PCT/US2018/063134 dated Feb. 26, 19, 15 Pgs.

Fillery et al. "Ion-exchanged glass laminates that exhibit a threshold strength", Journal of the American Ceramic Society 90(8) pp. 2502-2509, 2007.

* cited by examiner

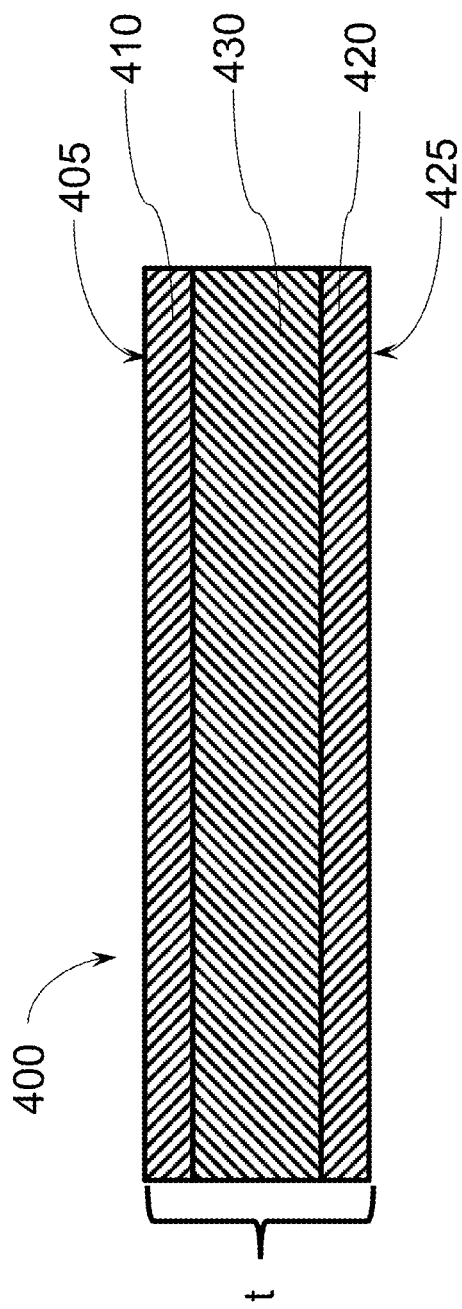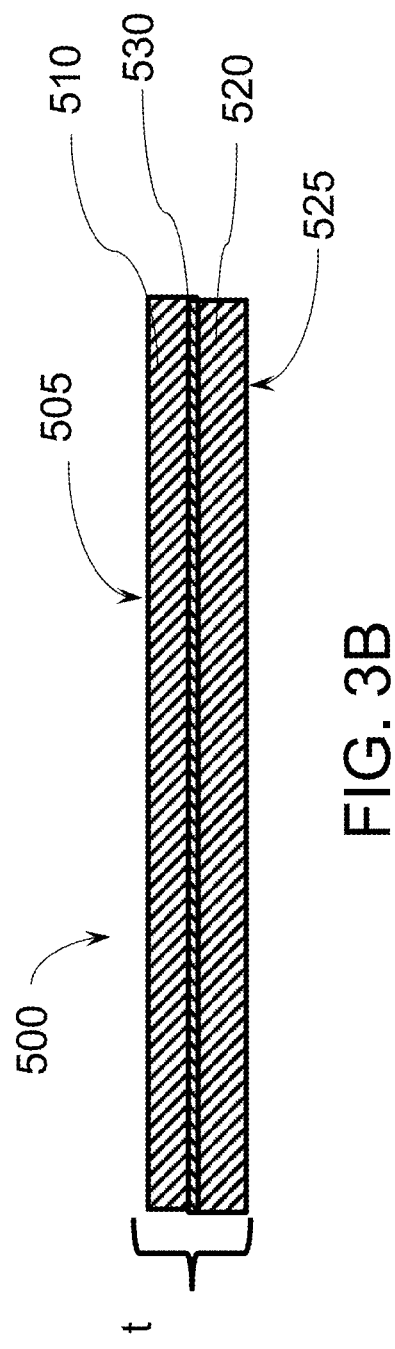

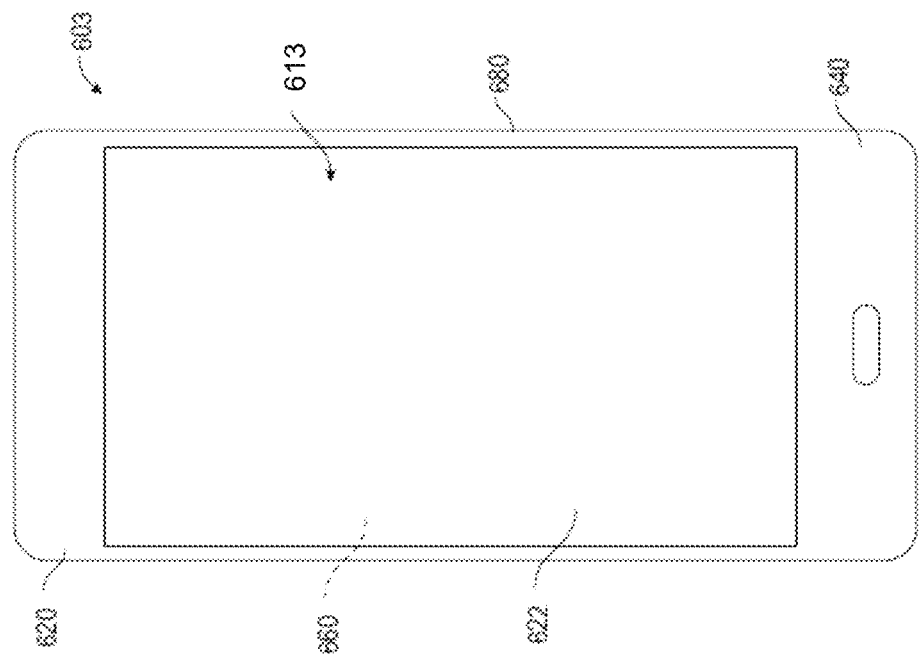

GLASS-BASED ARTICLES HAVING STRESS PROFILES WITH HIGH STORED ENERGY AND METHODS OF MANUFACTURE

RELATED APPLICATIONS

This application claims the benefit of priority of U.S. Provisional Application Ser. No. 62/592,708 filed on Nov. 30, 2017, the contents of which are relied upon and incorporated herein by reference in their entirety.

BACKGROUND

This disclosure relates to glass-based articles comprising stress profiles with relatively high stored energy and methods for manufacturing such glass-based articles.

Electronic devices, for example, handheld electronic devices such as mobile phones and tablets, include a cover substrate, which is typically made from glass and referred to as a cover glass. However, breakage of the cover glass of electronic devices is a persistent problem. The failure and breakage of cover glass can be attributed to flexural failure, caused by the bending of glass when the device is subjected to dynamic or static loading, as well as sharp contact failure, caused by damage introduction due to sharp indentation on the glass surface when the cover glass falls on a rough surface such as asphalt, concrete, etc.

There are two popular methods to produce a compressive surface stress on a glass surface, thermal strengthening (tempering) and chemical strengthening (ion-exchange). Thermally strengthening a glass product involves heating the product to near the softening temperature and then quenching or quickly cooling the product. As a result, the glass will possess a lower surface temperature than the interior during cooling. This temperature difference is maintained until the surface of the glass cools to room temperature. As the center of the glass also cools more slowly to room temperature it will contract to a smaller specific volume while the high specific volume of the surface layer remains unchanged. This leads to a surface compressive layer that gives tempered glass its strength. This process is currently being used to strengthen automobile side and rear windows.

As used herein, "thermally strengthened" refers to substrates that are heat treated to improve the strength of the substrate, and "thermally strengthened" includes tempered substrates and heat-strengthened substrates, for example tempered glass and heat-strengthened glass. Tempered glass involves an accelerated cooling process, which creates higher surface compression and/or edge compression in the glass. Factors that impact the degree of surface compression include the air-quench temperature, volume, and other variables that create a surface compression of at least 10,000 pounds per square inch (psi). Tempered glass is typically four to five times stronger than annealed or untreated glass. Heat-strengthened glass is produced by a lower differential cooling than tempered glass, which results in a lower compression strength at the surface and heat-strengthened glass is approximately twice as strong as annealed, or untreated, glass.

Traditionally, thermally strengthened glass has been used to prevent failures caused by the introduction of such flaws into the glass because thermally strengthened glass often exhibits large compressive stress (CS) layers (e.g., approximately 21% of the total thickness of the glass), which can prevent the flaws from propagating further into the glass and thus, can prevent failure. An example of a stress profile generated by thermal strengthening is shown in FIG. 1. In FIG. 1, the thermally treated glass article 100 includes a first surface 101, a thickness $t_1$, and a surface CS 110. The thermally treated glass article 100 exhibits a CS that decreases from the first surface 101 to a depth of compression (DOC) 130, as defined herein, at which depth the stress changes from compressive to tensile stress and then reaches a maximum central tension (CT) 120.

Thermal strengthening has been limited to thick glass-based articles (i.e., glass-based articles having a thickness $t_1$ of about 3 millimeters or greater) because, to achieve the thermal strengthening and the desired residual stresses, a sufficient thermal gradient must be formed between the core of such articles and the surface. Such thick articles are undesirable or not practical in many applications such as display (e.g., consumer electronics, including mobile phones, tablets, computers, navigation systems, and the like), architecture (e.g., windows, shower panels, countertops etc.), transportation (e.g., automotive, trains, aircraft, sea craft, etc.), appliance, or any application that requires superior fracture resistance but thin and light-weight articles. According to one or more embodiments, the stress-profiles described herein can be achieved by thermal strengthening.

The second popular strengthening method, ion-exchange (IOX) or chemical strengthening, works best for glasses containing mobile cations. In this method, glasses containing alkali ions, e.g. $Na^+$, are treated in a molten salt containing larger alkali ions, e.g. $K^+$, at a temperature below the glass transition temperature. Although alkali ions rest in specific positions within the rigid glass network, they possess the ability to move between sites. As a result, when an alkali-containing glass is immersed in a molten salt containing another type of larger alkali ions, some larger ions from the molten salt will exchange with those in the outer portions of the glass. If this process is performed at a temperature below the glass transition temperature, such that stress relaxation is sluggish compared to the rate of ion-exchange, large ions will find themselves stuffed into rigid sites that are too small. Since the structure cannot relax to accommodate the newly acquired larger ions, a biaxial compressive stress is formed. This process, sometimes called ion-stuffing or chemical tempering, can produce a surface layer with an extremely high compressive stress on the glass and is currently employed to strengthen products such as aircraft windows and scratch resistant touch-screens on electronic devices.

Although chemical strengthening is not limited by the thickness of the glass-based article in the same manner as thermal strengthening, known chemically strengthened glass-based articles do not exhibit the stress profile of thermally strengthened glass-based articles. An example of a stress profile generated by chemical strengthening (e.g., by an ion exchange process), is shown in FIG. 2. In FIG. 2, the chemically strengthened glass-based article 200 includes a first surface 201, a thickness $t_2$ and a surface CS 210. The glass-based article 200 exhibits a CS that decreases from the first surface 201 to a depth of compression (DOC) 230, as defined herein, at which depth the stress changes from compressive to tensile stress and then reaches a maximum central tension (CT) 220. As shown in FIG. 2, such profiles exhibit a substantially flat CT region or CT region with a constant or near constant tensile stress along at least a portion of the CT region. Often, known chemically strengthened glass-based articles exhibit a lower maximum CT value, as compared to the maximum central tension value shown in FIG. 1.

Glass-based articles often experience severe impacts that can introduce large flaws into a surface of such articles. Such flaws can extend to depths of up to about 200 micrometers from the surface. It has been shown that depth of layer correlates well with increased rough surface device drop performance of cover glass. Currently, one feasible profile that is utilized to optimize depth of layer is a parabolic profile, which can be achieved by thermal strengthening or by very deep ion exchange. In addition, for glass substrates having a parabolic residual stress profile, higher stored energy profiles have improved drop performance. There is a need for glass-based articles that exhibit improved properties, such as resistance to fracture due to dropping of the articles, particularly when subjected to sharp contact damage, while also limiting or preventing crack bifurcations in the glass-based article.

SUMMARY

An aspect of this disclosure pertains to a glass-based article having a surface and a thickness (t), the glass-based article comprising an outer region extending from the surface to a depth of compression, wherein the outer region is under a neutral stress or a first compressive stress; a core region under a second compressive stress, the second compressive stress defining a compression peak having a maximum compression value and a maximum width at zero stress in a range of from about 1 micrometer to about 200 micrometers; and an intermediate region disposed between the surface and the core region, wherein the intermediate region is under a tensile stress.

Another aspect of the disclosure pertains to a device comprising: a housing having front, back, and side surfaces; electrical components that are at least partially inside the housing; a display at or adjacent to the front surface of the housing; and a cover substrate disposed over the display, wherein a portion of at least one of the cover substrate and the housing comprises the glass-based article of the first aspect of the disclosure.

Another aspect pertains to a glass-based article having a surface and a thickness (t), the glass-based article comprising: an outer region extending from the surface to a depth of compression, wherein the outer region is under neutral stress or a first compressive stress; a core region under a second compressive stress, the core region including a mid-point between the surface and a second surface opposite the surface of the glass-based article, the second compressive stress defining a compression peak having a maximum compression value and a maximum width such that there is an aspect ratio of the maximum compression value (in MPa) to the maximum width (in microns) that is greater than 2:1; and an intermediate region disposed between the surface and the core region, wherein the intermediate region is under a tensile stress, wherein the glass-based article has a stress profile that results in stored energy in the glass-based article that prevents cracks formed by surface-induced damage from penetrating through the entire thickness of the glass-based article.

Another aspect of this disclosure pertains to a method of making a glass-based article comprising: providing first glass-based substrate having a surface, a thickness (t), and an outer region extending from the surface to a depth of compression, wherein the outer region has a first compressive stress at the surface and a decreasing stress region such that the first glass-based substrate has a parabolic stress profile; providing a second glass-based substrate having a surface, a thickness (t), and an outer region extending from the surface to a depth of compression, wherein the outer region has a second compressive stress at the surface and a decreasing stress region such that the second glass-based substrate has a parabolic stress profile; and bonding the first glass-based substrate and the second glass-based substrate together at a bonding interface to provide the glass-based article having a compression peak in a central region of the glass-based article including the bonding interface.

Another aspect of this disclosure pertains to a glass-based article having a surface and a thickness (t), the glass-based article comprising: a core region under compressive stress disposed between two cladding regions under tensile stress, wherein the compressive stress and the tensile stress are such that initiation of a flaw at a point of origin that penetrates a cladding region generates a laterally propagating crack that does not bifurcate within a distance of 17 millimeters from the point of origin.

Another aspect of this disclosure pertains to a glass-based article having a surface, a thickness (t) and an edge defining a perimeter, the glass-based article comprising: a core region under compressive stress disposed between two cladding regions under tensile stress, wherein the compressive stress and the tensile stress are such that initiation of a flaw at a point of origin that penetrates a cladding region and is more than 5 millimeters, or more than 10 millimeters from the edge generates a laterally propagating crack that self-terminates before reaching the edge of the glass-based article.

Another aspect of this disclosure pertains to a glass-based article having a surface, a thickness (t) and an edge defining a perimeter, the glass-based article comprising: a core region under compressive stress disposed between two cladding regions under tensile stress, wherein the glass-based article is formed from a glass-based composition, and the compressive stress and the tensile stress are such that the glass-based article comprises a tensile-strain energy TSE defined by the equation:

$$TSE = \frac{(1-v)}{2E}\left[\int_{\text{tensile }\sigma_x(z)} \sigma_x^2(z)dz + \int_{\text{tensile }\sigma_y(z)>0} \sigma_y^2(z)dz\right]$$

where $v$ is the Poisson's ratio of the glass-based composition, E is Young's modulus of the glass-based composition, z is a coordinate along the thickness, x and y are two mutually orthogonal directions in the surface of the glass-based article, $\sigma_x \equiv \sigma_{xx}$ and $\sigma_y \equiv \sigma_{yy}$ are the components of stress along x and y.

In some embodiments, components, $\sigma_x$ and $\sigma_y$ are approximately equal and the tensile-strain energy is defined by the equation $$TSE = \frac{(1-v)}{E}\left[\int_{\text{tensile }\sigma(z)} \sigma^2(z)dz\right],$$

wherein $\sigma_x = \sigma_y = \sigma$ and the tensile-strain energy has units of $$\frac{J}{m^2},$$

and denotes energy stored in a tensile-stress region, in stretching modes along the x and y directions, per unit area of the surface.

Another aspect of this disclosure pertains to a glass-based article having a surface, a thickness (t) and an edge defining a perimeter, the glass-based article comprising: a core region under compressive stress disposed between two cladding regions under tensile stress, wherein the compressive stress and the tensile stress are such that the glass based article comprises a tensile-stress intensity parameter $K_t$ defined by the equation:

$$K_t = \sqrt{\int_{tensile\ \sigma(z)} \sigma^2(z)dz}$$

wherein parameters $K_t$ has units of MPa×$\sqrt{m}$.

According to aspect (1), a glass-based article is provided. The glass-based article has a surface and a thickness (t). The glass-based article comprises: an outer region extending from the surface to a depth of compression, wherein the outer region is under a neutral stress or a first compressive stress; a core region under a second compressive stress, the second compressive stress defining a compression peak having a maximum compression value and a maximum width at zero stress in a range of from 1 micrometer to 200 micrometers; and an intermediate region disposed between the surface and the core region, wherein the intermediate region is under a tensile stress.

According to aspect (2), the glass-based article of aspect (1) is provided, wherein the compression peak has a maximum width at zero stress in a range of from 5 micrometers to 200 micrometers.

According to aspect (3), the glass-based article of aspect (1) or (2) is provided, wherein the compression peak has a maximum width at zero stress in a range of from 10 micrometers to 40 micrometers.

According to aspect (4), the glass-based article of any of aspects (1) to (3) is provided, wherein the outer region is under the first compressive stress defining a surface compressive stress.

According to aspect (5), the glass-based article of aspect (4) is provided, wherein the compression peak has a maximum compressive stress that is at least 50% of the surface compressive stress.

According to aspect (6), the glass-based article of aspect (4) or (5) is provided, wherein the compression peak has a maximum compressive stress that is at least 70% of the surface compressive stress.

According to aspect (7), the glass-based article of aspect (4) is provided, wherein the surface compressive stress is in a range of from 300 MPa to 1200 MPa.

According to aspect (8), the glass-based article of aspect (4) is provided, wherein the surface compressive stress is in a range of from 600 MPa to 1000 MPa.

According to aspect (9), the glass-based article of aspect (7) or (8) is provided, wherein the compression peak has a maximum compressive stress that is at least 30% of the surface compressive stress.

According to aspect (10), the glass-based article of any of aspects (7) to (9) is provided, wherein the compression peak has a maximum compressive stress that is at least 50% of the surface compressive stress.

According to aspect (11), the glass-based article of any of aspects (1) to (10) is provided, wherein the compression peak comprises an increasing stress region such that all points of the increasing stress region comprise a tangent having a value that is in a range of from 20 MPa/micrometer to 200 MPa/micrometer and a decreasing stress region such that all points of the decreasing stress region comprise a tangent having a value that is in a range of from −20 MPa/micrometer to −200 MPa/micrometer.

According to aspect (12), the glass-based article of any of aspects (1) to (11) is provided, wherein outer region is under the first compressive stress and extends to a depth of compression (DOC) where the glass-based article has a stress value of zero, the DOC being in a rage of 0.05·t and 0.30·t.

According to aspect (13), the glass-based article of aspect (12) is provided, wherein the tensile stress in the intermediate region has a maximum tensile stress absolute value less than an absolute value of the maximum compression value of the compression peak.

According to aspect (14), the glass-based article of any of aspects (1) to (13) is provided, wherein the thickness (t) of the glass-based article is in a range of 0.1 mm to 3.0 mm.

According to aspect (15), the glass-based article of any of aspects (1) to (14) is provided, wherein the glass-based article has a stress profile that results in stored tensile energy in the glass-based article, such that when damage is introduced into a surface of the glass-based article, the stress profile reduces crack bifurcations compared to a glass-based article having the same amount of stored tensile energy and not having the compression peak.

According to aspect (16), the glass-based article of any of aspects (1) to (15) is provided, wherein, the core region includes a mid-point between the surface and a second surface opposite the surface of the glass-based article.

According to aspect (17), the glass-based article of any of aspects (1) to (16) is provided, comprising an alkali aluminosilicate glass.

According to aspect (18), the glass-based article of any of aspects (1) to (17) is provided, wherein the glass-based article is formed from a glass-based composition comprising $Li_2O$ in a range of 0.1 mol % and 20 mol %.

According to aspect (19), the glass-based article of any of aspects (1) to (18) is provided, wherein the glass-based article is formed from a glass-based composition comprising $B_2O_3$ in a range of 0.1 mol % and 10 mol %.

According to aspect (20), the glass-based article of any of aspects (1) to (19) is provided, wherein the glass-based article is formed from a glass-based composition comprising $P_2O_5$ in a range of 0.1 mol % and 10 mol %.

According to aspect (21), the glass-based article of any of aspects (1) to (20) is provided, wherein the glass-based article is formed from a glass-based composition that is substantially free of $K_2O$.

According to aspect (22), a device is provided. The device comprises: a housing having front, back, and side surfaces; electrical components that are at least partially inside the housing; a display at or adjacent to the front surface of the housing; and a cover substrate disposed over the display. At least a portion of at least one of the cover substrate and the housing comprises the glass-based article of any of aspects (1) to (21).

According to aspect (23), a glass-based article is provided. The glass-based article having a surface and a thickness (t). The glass-based article comprises: an outer region extending from the surface to a depth of compression, wherein the outer region is under neutral stress or a first compressive stress; a core region under a second compressive stress, the core region including a mid-point between the surface and a second surface opposite the surface of the glass-based article, the second compressive stress defining a compression peak having a maximum compression value and a maximum width such that there is an aspect ratio of the maximum compression value in MPa to the maximum width in microns that is greater than 2:1; and an intermediate region disposed between the surface and the core region, wherein the intermediate region is under a tensile stress, wherein the glass-based article has a stress profile that results in stored energy in the glass-based article that prevents cracks formed by surface-induced damage from penetrating through the entire thickness of the glass-based article.

According to aspect (24), the glass-based article of aspect (23) is provided, wherein the glass-based article comprises a pair of glass-based substrates bonded together.

According to aspect (25), the glass-based article of aspect (24) is provided, wherein the pair of glass-based substrates are bonded together by covalent bonding.

According to aspect (26), the glass-based article of aspect (25) is provided, wherein the covalent bonding comprises a Si—O—Si bond.

According to aspect (27), the glass-based article of aspect (24) is provided, wherein the glass-based substrates are bonded together with a polymer.

According to aspect (28), the glass-based article of aspect (24) is provided, wherein the glass-based substrates are bonded together by spin-on glass.

According to aspect (29), a method of making a glass-based article is provided. The method comprises: providing a first glass-based substrate having a surface, a thickness ($t_1$), and an outer region extending from the surface to a depth of compression, wherein the outer region has a first compressive stress at the surface and a decreasing stress region such that the first glass-based substrate has a parabolic stress profile; providing a second glass-based substrate having a surface, a thickness ($t_2$), and an outer region extending from the surface to a depth of compression, wherein the outer region has a second compressive stress at the surface and a decreasing stress region such that the second glass-based substrate has a parabolic stress profile; and bonding the first glass-based substrate and the second glass-based substrate together at a bonding interface to provide the glass-based article having a compression peak in a central region of the glass-based article including the bonding interface.

According to aspect (30), the method of aspect (29) is provided, wherein the first glass-based substrate outer region has a first compressive stress at the surface and a decreasing stress region such that all points of the decreasing stress region comprise a tangent having a value that is in a range of −20 MPa/micrometer and −200 MPa/micrometer, and the second glass-based substrate has a compressive stress at the surface and a decreasing stress region such that all points of the decreasing stress region comprise a tangent having a value that is in a range of −20 MPa/micrometer and −200 MPa/micrometer.

According to aspect (31), the method of aspect (29) or (30) is provided, where the bonding is conducted without a polymer or adhesive.

According to aspect (32), the method of any of aspects (29) to (31) is provided, further comprising heating the first glass-based substrate and the second glass-based substrate during bonding.

According to aspect (33), the method of aspect (32) is provided, wherein heating includes heating to a temperature and for a time sufficient to form a covalent bond between the first glass-based substrate and the second glass-based substrate.

According to aspect (34), the method of aspect (32) or (33) is provided, further comprising heating to a temperature of at least 400° C. for a period of time of at least 30 minutes.

According to aspect (35), the method of any one of aspects (29) to (34) is provided, further comprising ion-exchanging the glass-based article.

According to aspect (36), the method of aspect (29) or (30) is provided, wherein the bonding is conducted with spin-on glass or a polymer.

According to aspect (37), the method of any one of aspects (29) to (36) is provided, wherein the glass-based article has a stress profile after bonding, and the glass-based article is subjected to a heat treatment after bonding at a temperature that modifies the stress profile of the glass-based article.

According to aspect (38), the method of aspect (37) is provided, wherein the heat treatment is at a temperature in a range of from 280° C. to 500° C.

According to aspect (39), the method of aspect (29) or (30) is provided, wherein bonding the first glass-based substrate and the second glass-based substrate together comprises draw forming the first glass-based substrate having a first coefficient of thermal expansion and draw forming the second glass-based substrate having a second coefficient of thermal expansion.

According to aspect (40), the method of aspect (39) is provided, wherein bonding the first glass-based substrate and second glass-based substrate occurs at or above a softening point of at least one of the first glass-based substrate and second glass-based substrate.

According to aspect (41), the method of aspect (40) is provided, further comprising cooling the glass-based article to produce a core region of the glass-based article that is in compression and a cladding region of the glass-based article that is in tension.

According to aspect (42), the method of aspect (41) is provided, wherein the core region has a compressive stress greater than or equal to 100 MPa and less than or equal to 1000 MPa, and the cladding has a maximum tensile stress of less than the value of the maximum compressive stress.

According to aspect (43), the method of aspect (39) is provided, wherein after bonding the first glass-based substrate and second glass-based substrate to form the glass-based article, the glass-based article is thermally tempered.

According to aspect (44), the method of any one of aspects (39) to (43) is provided, wherein the glass-based article is ion-exchanged after bonding.

According to aspect (45), the method of any one of aspects (39) to (44) is provided, wherein the glass-based article is thermally tempered and ion-exchanged after bonding.

According to aspect (46), the method of any one of aspects (39) to (45) is provided, wherein the glass-based article is ion-exchanged after bonding to produce a tensile stress spike at the surface that is greater than or equal to 300 MPa and less than or equal to 1200 MPa, the depth of the spike extending in a range of 3 micrometers to 30 micrometers from the surface of the glass-based article.

According to aspect (47), a glass-based article is provided. The glass-based article having a surface and a thickness (t). The glass-based article comprises: a core region under compressive stress disposed between two cladding regions under tensile stress, wherein the compressive stress and the tensile stress are such that initiation of a flaw at a point of origin that penetrates a cladding region generates a laterally propagating crack that does not bifurcate within a distance of 17 millimeters from the point of origin.

According to aspect (48), a glass-based article is provided. The glass-based article having a surface and a thickness (t). The glass-based article comprises: a core region under compressive stress disposed between two cladding regions under tensile stress, wherein the compressive stress and the tensile stress are such that initiation of a flaw at a point of origin that penetrates a cladding region and is more than 5 millimeters from the edge generates a laterally propagating crack that self-terminates before reaching the edge of the glass-based article.

According to aspect (49), the glass based article of aspect (48) is provided, wherein the point of origin is more than 10 millimeters from the edge of the glass-based article.

According to aspect (50), a glass-based article is provided. The glass-based article having a surface and a thickness (t). The glass-based article comprises: a core region under compressive stress disposed between two cladding regions under tensile stress, wherein the glass-based article is formed from a glass-based composition, and the compressive stress and the tensile stress are such that the glass based article comprises a tensile-strain energy TSE defined by the equation:

$$TSE = \frac{(1-v)}{2E}\left[\int_{\text{tensile } \sigma_x(z)} \sigma_x^2(z)dz + \int_{\text{tensile } \sigma_y(z)>0} \sigma_y^2(z)dz\right]$$

where $v$ is the Poisson's ratio of the glass-based composition, E is Young's modulus of the glass-based composition, z is a coordinate along the thickness, x and y are two mutually orthogonal directions in the surface of the glass-based article, $\sigma_x \equiv \sigma_{xx}$ and $\sigma_y \equiv \sigma_{yy}$ are the components of stress along x and y.

According to aspect (51), the glass based article of aspect (50) is provided, wherein components, $\sigma_x$ and $\sigma_y$ are approximately equal and the tensile-strain energy is defined by the equation $$TSE = \frac{(1-v)}{E}\left[\int_{\text{tensile } \sigma(z)} \sigma^2(z)dz\right],$$

wherein, $\sigma_x = \sigma_y = \sigma$ and the tensile-strain energy has units of $$\frac{J}{m^2},$$

and denotes energy stored in a tensile-stress region, in stretching modes along the x and y directions, per unit area of the surface.

According to aspect (52), a glass-based article is provided. The glass-based article having a surface and a thickness (t). The glass-based article comprises: a core region under compressive stress disposed between two cladding regions under tensile stress, wherein the compressive stress and the tensile stress are such that the glass based article comprises a tensile-stress intensity parameter $K_t$ defined by the equation:

$$K_t = \sqrt{\int_{\text{tensile } \sigma(z)} \sigma^2(z)dz}$$

wherein parameter $K_t$ has units of MPa×√m.

According to aspect (53), a device is provided. The device comprises: a housing having front, back, and side surfaces; electrical components that are at least partially inside the housing; a display at or adjacent to the front surface of the housing; and a cover substrate disposed over the display. At least a portion of at least one of the cover substrate and the housing comprises the glass-based article of any of aspects (23) to (28) and (47) to (52).

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 3A illustrates a cross-sectional view of an embodiment of a strengthened glass-based article;

FIG. 3B illustrates a cross-sectional view of an embodiment of a strengthened glass-based article FIG. 4 is a front plan view of an electronic device incorporating one or more embodiments of the glass-based articles described herein;

DETAILED DESCRIPTION

Figure 1:
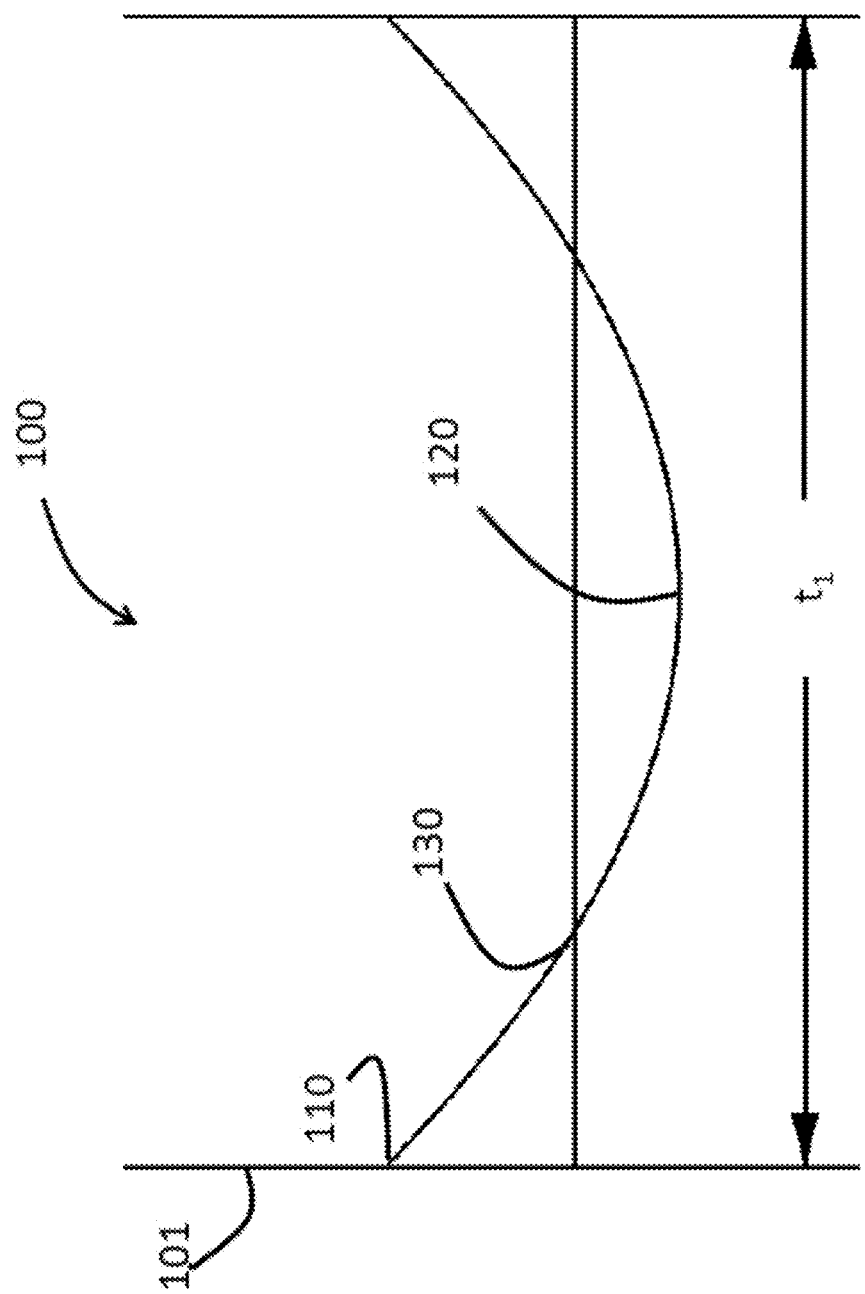
FIG. 1 is a cross-sectional view of a stress profile across a thickness of a known, thermally strengthened glass-based article.
Figure 2:
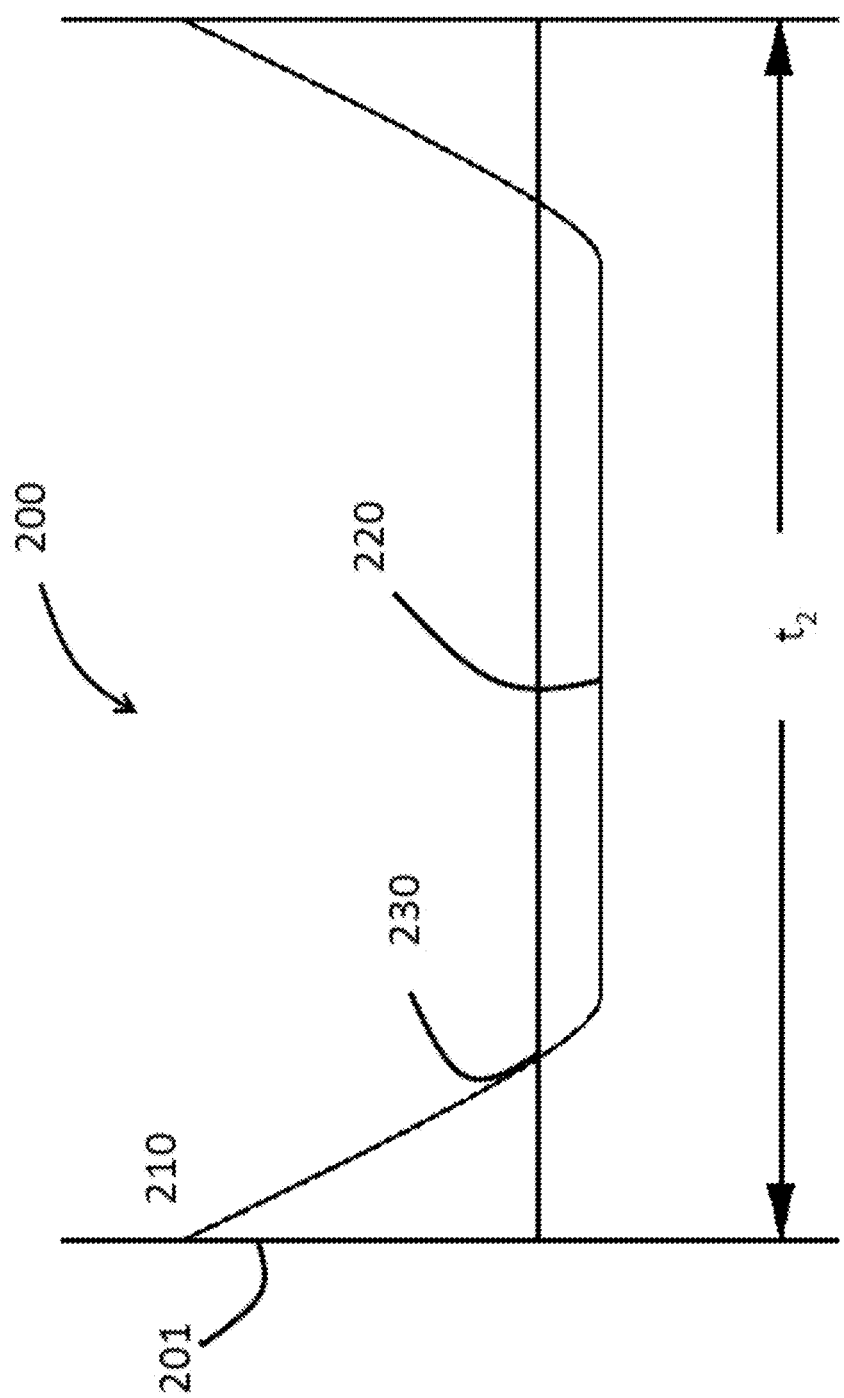
FIG. 2 is a cross-sectional view of a stress profile across a thickness of a known, chemically strengthened glass-based article.

Before describing several exemplary embodiments, it is to be understood that the disclosure is not limited to the details of construction or process steps set forth in the following disclosure. The disclosure provided herein is capable of other embodiments and of being practiced or being carried out in various ways.

Embodiments of the disclosure provide strengthened glass-based articles that have a stored energy profile that prevents cracks formed by surface-induced damage from penetrating through the entire thickness of the glass-based article. The amount of energy that can be safely stored in a glass-based article is limited by the fracture behavior of the glass. In other words, the stored tensile energy must be lower than the value at which a bifurcation will occur when a crack propagates. This limits the stored tensile energy for parabolic stress profiles.

According to one or more embodiments of the disclosure, bifurcations are prevented from occurring in glass-based articles when cracks self-propagate in glass-based articles having parabolic stress profiles by keeping the stored tensile energy below a threshold value. However, the present disclosure is not limited to parabolic stress profiles, and other profiles can be provided which slow crack growth and keep the crack growth speed below the value at which bifurcations occur. In certain embodiments of the disclosure, the stored tensile energy is separated by a compressive or zero stress region in the center, which slows the crack growth in two ways. In one embodiment, this can be achieved by separating the energy resulting in two crack fronts or a complex shaped crack front instead of a single crack front. In other embodiments, this can be achieved by "pinning" the crack in the center, which prevents the separation of the surfaces and further crack growth. In one or more embodiments, crack growth is blunted or slowed by introducing imperfections in the tensile stress region, or by increasing toughness of the glass-based material.

According to one or more embodiments, high stored energy glass-based articles are provided, the articles exhibiting excellent drop performance. In one or more embodiments, the glass-based articles will be safe to handle despite their high stored energy and could be used in various applications. In one or more embodiments, stored energy in glass-based articles will prevent cracks from penetrating through the thickness. The glass-based articles will therefore not separate into pieces even after fracturing.

The glass-based articles can be used as a cover or a housing in a variety of mobile electronic devices. The electronic device can be portable and in some cases handheld. According to one or more embodiments, "handheld device" refers to a portable electronic device that has a display screen. Non-limiting examples of such electronic devices include a mobile telephone, an electronic reading device, a music playback device, and a navigation device. In one or more embodiments, the strengthened glass-based articles described herein can also be used to cover displays or for other purposes in electronic devices including, but not limited to, relatively larger form factor electronic devices (e.g., portable computers, tablet computers, displays, monitors, televisions, etc.). The strengthened glass-based articles described herein may be a part of a wearable consumer electronic device, such as a watch, a media player, a wallet and a bracelet. Such wearable devices are configured to be worn by an individual, for example, by attaching the wearable device to a person's arm, leg, hand, etc. by a strap or other suitable attachment mechanism.

Improved stress profiles for glass-based articles, such as a cover glass of a mobile electronic device, have been discovered. In one or more embodiments, glass-based articles have profiles which have stored tensile energy that slows or prevents growth of cracks in the glass-based articles.

In chemically strengthened glass substrates, the replacement of smaller ions by larger ions at a temperature below that at which the glass network can significantly relax produces a distribution of ions across the surface of the glass that results in a stress profile. The larger volume of the incoming ion produces a compressive stress (CS) on the surface and tension (central tension, or CT) in the center of the glass.

The glass-based articles exhibit improved surface strength when subject to abraded ring-on-ring (AROR) testing. According to one or more embodiments, the increase or decrease in strength on one side of a glass-based substrate can be determined using abraded ring on ring (AROR) testing. The strength of a material is defined as the stress at which fracture occurs. The AROR test is a surface strength measurement for testing flat glass specimens, and ASTM C1499-09(2013), entitled "Standard Test Method for Monotonic Equibiaxial Flexural Strength of Advanced Ceramics at Ambient Temperature," serves as the basis for the AROR test methodology described herein. The contents of ASTM C1499-09 are incorporated herein by reference in their entirety. The glass specimen is abraded prior to ring-on-ring testing with 90 grit silicon carbide (SiC) particles that are delivered to the glass sample using the method and apparatus described in Annex A2, entitled "Abrasion Procedures," of ASTM C158-02(2012), entitled "Standard Test Methods for Strength of Glass by Flexure (Determination of Modulus of Rupture). The contents of ASTM C158-02 and the contents of Annex 2 in particular are incorporated herein by reference in their entirety.

Prior to ring-on-ring testing a surface of the glass-based article is abraded as described in ASTM C158-02, Annex 2, to normalize and/or control the surface defect condition of the sample using the apparatus shown in Figure A2.1 of ASTM C158-02. The abrasive material is sandblasted onto the surface of the glass-based article at an air pressure of 15 psi. After air flow is established, 5 cm$^3$ of abrasive material is dumped into a funnel and the sample is sandblasted for 5 seconds after introduction of the abrasive material.

Figure 12:
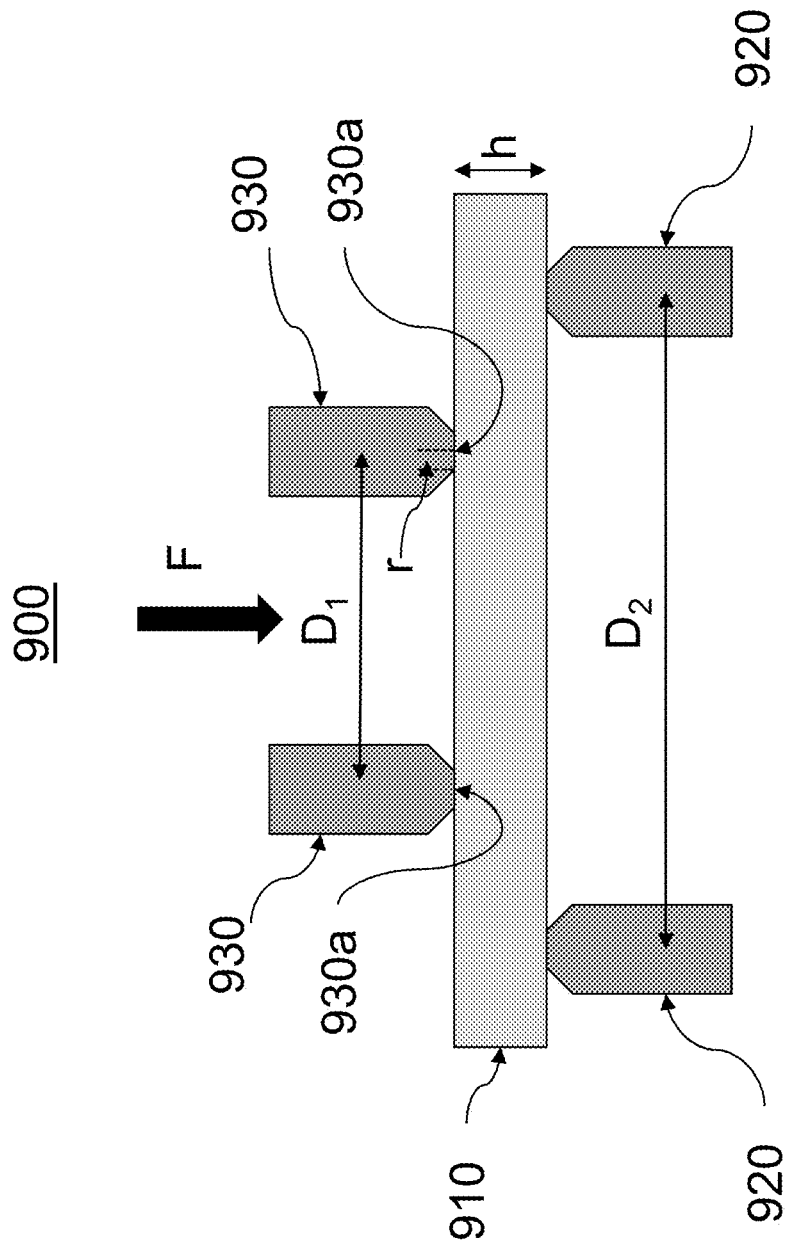
FIG. 12 schematically illustrates an abraded ring-on-ring (AROR) test.

For the AROR test, a glass-based article having at least one abraded surface as shown in FIG. 12 is placed between two concentric rings of differing size to determine equibiaxial flexural strength (i.e., the maximum stress that a material is capable of sustaining when subjected to flexure between two concentric rings). In the AROR configuration 900, the abraded glass-based article 910 is supported by a support ring 920 having a diameter $D_2$. A force F is applied by a load cell (not shown) to the surface of the glass-based article by a loading ring 930 having a diameter $D_1$.

The ratio of diameters of the loading ring and support ring D1/D2 may be in a range from 0.2 to 0.5. In some embodiments, $D_1/D_2$ is 0.5. Loading and support rings 930, 920 should be aligned concentrically to within 0.5% of support ring diameter $D_2$. The load cell used for testing should be accurate to within ±1% at any load within a selected range. Testing is carried out at a temperature of 23±2° C. and a relative humidity of 40±10%.

For fixture design, the radius r of the protruding surface of the loading ring 930 is in a range of h/2≤r≤3h/2, where his the thickness of glass-based article 910. Loading and support rings 930, 920 are made of hardened steel with hardness HRc>40. AROR fixtures are commercially available.

The intended failure mechanism for the AROR test is to observe fracture of the glass-based article 910 originating from the surface 930a within the loading ring 930. Failures that occur outside of this region—i.e., between the loading ring 930 and support ring 920—are omitted from data analysis. Due to the thinness and high strength of the glass-based article 910, however, large deflections that exceed ½ of the specimen thickness h are sometimes observed. It is therefore not uncommon to observe a high percentage of failures originating from underneath the loading ring 930. Stress cannot be accurately calculated without knowledge of stress development both inside and under the ring (collected via strain gauge analysis) and the origin of failure in each specimen. AROR testing therefore focuses on peak load at failure as the measured response.

Strengthened glass-based articles are formed from glass-based substrates, and these glass-based substrates may be provided using a variety of different processes. For example, glass-based substrate forming methods include float glass processes and down-draw processes, such as fusion draw and slot draw. A glass-based substrate prepared by a float glass process may be characterized by smooth surfaces and uniform thickness, and is made by floating molten glass on a bed of molten metal, typically tin. In an exemplary process, molten glass that is fed onto the surface of the molten tin bed forms a floating glass ribbon. As the glass ribbon flows along the tin bath, the temperature is gradually decreased until the glass ribbon solidifies into a solid glass substrate that can be lifted from the tin bath onto rollers. Once off the bath, the glass-based substrate can be cooled further and annealed to reduce internal stress.

Down-draw processes produce glass-based substrates having a uniform thickness that possess relatively pristine surfaces. Because the average flexural strength of the glass-based substrate is controlled by the amount and size of surface flaws, a pristine surface that has had minimal contact has a higher initial strength. When this high strength glass-based substrate is then further strengthened (e.g., chemically), the resultant strength can be higher than that of a glass-based substrate with a surface that has been lapped and polished. Down-drawn glass-based substrates may be drawn to a thickness of less than about 2 mm. In addition, down drawn glass-based substrates have a very flat, smooth surface that can be used in its final application without costly grinding and polishing.

The fusion draw process, for example, uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass-based substrate. The fusion draw method offers the advantage that, because the two glass films flowing over the channel fuse together, neither of the outside surfaces of the resulting glass substrate comes in contact with any part of the apparatus. Thus, the surface properties of the fusion drawn glass-based substrate are not affected by such contact.

The slot draw process is distinct from the fusion draw method. In slot draw processes, the molten raw material glass is provided to a drawing tank. The bottom of the drawing tank has an open slot with a nozzle that extends the length of the slot. The molten glass flows through the slot/nozzle and is drawn downward as a continuous glass-based substrate and into an annealing region.

The terms "glass-based" is used herein to include any object made wholly or partly of glass, such as laminates of glass and non-glass materials, laminates of glass and crystalline materials, and glass-ceramics (including an amorphous phase and a crystalline phase). Glass-based substrates according to one or more embodiments can be selected from soda-lime silicate glass (SLS), alkali-alumino silicate glass, alkali-containing borosilicate glass, alkali-containing aluminoborosilicate glass, and alkali-free alumino silicate glass.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, for example, a glass-based article that is "substantially free of MgO" is one in which MgO is not actively added or batched into the glass-based article, but may be present in very small amounts as a contaminant. Additionally, when a value is disclosed herein modified by the term "about," the exact value is also disclosed. For example, "about 5 mol %" also discloses the exact value "5 mol %." Unless otherwise specified, all compositions described herein are expressed in terms of mole percent (mol %).

As used herein, depth of compression (DOC) means the depth at which the stress in the glass-based article described herein changes from compressive to tensile, i.e., where stress is zero. DOC may be measured by surface stress meter (FSM) or a scattered light polariscope (SCALP), depending on the ion exchange treatment. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions (potassium DOL) in such glass articles is measured by FSM. Compressive surface stress (surface CS) is measured by surface stress meter (FSM) using commercially available instruments such as the FSM-6000, manufactured by Orihara Industrial Co., Ltd. (Japan). Surface stress meter (FSM) measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety.

Unless otherwise specified, CT and CS are expressed herein in megaPascals (MPa), whereas thickness and DOC are expressed in millimeters or microns (micrometers). Refracted near-field (RNF) method or SCALP may be used to measure the stress profile. When the RNF method is utilized to measure the stress profile, the maximum CT value provided by SCALP is utilized in the RNF method. In particular, the stress profile measured by RNF is force balanced and calibrated to the maximum CT value provided by a SCALP measurement. The RNF method is described in U.S. Pat. No. 8,854,623, entitled "Systems and methods for measuring a profile characteristic of a glass sample", which is incorporated herein by reference in its entirety. In particular, the RNF method includes placing the glass article adjacent to a reference block, generating a polarization-switched light beam that is switched between orthogonal polarizations at a rate of between 1 Hz and 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal.

According to one or more embodiments, critical values are defined for the tensile-strain energy (also called "stored tensile energy" in the present disclosure) stored in certain components of the stress, and tensile-stress intensity parameter $K_t$. In some embodiments, these critical values can not only be used to improve glass-based article properties (e.g., reduced tendency of crack bifurcations), but also in some specific embodiments to achieve certain preferred performance targets, such as limiting or even eliminating crack bifurcations, or achieving crack self-termination. The tensile-strain energy TSE (or "stored tensile energy") used in some embodiments of the present disclosure is defined by the equation:

$$TSE = \frac{(1-v)}{2E}\left[\int_{tensile\ \sigma_x(z)} \sigma_x^2(z)dz + \int_{tensile\ \sigma_y(z)>0} \sigma_y^2(z)dz\right]$$

where v is the Poisson's ratio of the glass-based composition utilized to form the glass-based article, E is Young's modulus of the glass-based composition utilized to form the glass-based article, z is the coordinate along the thickness dimension, x and y are two mutually orthogonal directions in the main plain of the glass-based substrate, $\sigma_x \equiv \sigma_{xx}$ and $\sigma_y \equiv \sigma_{yy}$ are the components of stress along x and y. The integration is performed over the region of thickness where the stress is tensile. The stress may be generated by combinations of chemical strengthening, thermal strengthening, and lamination, as described in the present disclosure. In the examples in the present disclosure, a simpler version of the TSE is used, by assuming that the stress components, $\sigma_x$ and $\sigma_y$ are approximately equal which is true in the interior of the wide area of the vast majority of strengthened glass-based articles. Then the simpler version of the tensile-strain energy is given by the equation $$TSE = \frac{(1-v)}{E}\left[\int_{tensile\ \sigma(z)} \sigma^2(z)dz\right]$$

Where it is assumed $\sigma_x = \sigma_y = \sigma$. The tensile-strain energy has units of $$\frac{J}{m^2},$$

and signifies the energy stored in the tensile-stress region, in the stretching modes along the x and y directions, per unit sheet area (single-side counting of area). The tensile-stress intensity parameter $K_t$ used in one or more embodiments of the present disclosure is defined by the equation:

$$K_t = \sqrt{\int_{tensile\ \sigma(z)} \sigma^2(z)dz}$$

The parameters $K_t$ has units of MPa×√m, same as the units for fracture toughness and stress-intensity factor. In cases where $\sigma_x \approx \sigma_y \approx \sigma$, the parameter $K_t$ stands for either of the x or y dimensions. In cases where the components $\sigma_x$ and $\sigma_y$ differ substantially, a parameter $K_t$ can be calculated for each component, and the larger of the two values can be used in a conservative criterion for avoiding or suppressing bifurcations or crack extension, whereas the average of the two values of $K_t$ calculated for the x and y dimensions can be used in a non-conservative criterion.

In some embodiments of the present disclosure, the region of thickness that is in tension is divided into more than one tensile region by an interior compression region. Then a TSE and a parameter $K_t$ can be calculated for each tensile region separately.

It has been shown that the level of fragmentation upon fracture for a prior art tempered glass sheet having a single interior tension zone, enclosed between two exterior compression zones, can be predicted with a good degree of accuracy by calculating the TSE or the parameter $K_t$. It has been determined that when the tension zone for the in-plane stresses of a strengthened glass-based article is split into more than one tensile region, the level of fragmentation of the glass-based article can be controlled by controlling the TSE or $K_t$ in each region. In one or more embodiments of the present disclosure, the splitting of the tension zone of the strengthened glass article by an internal layer of compression generally leads to a decrease in the fragmentation density (or tendency for bifurcations) upon fracture using a sharp tool. This is highly sought and beneficial in many applications, such as cover glass-based articles for electronic devices, such as mobile electronic devices. It has been determined that imposing a limit on $K_t$ or TSE for each tensile region, and more importantly to the tensile region closest to the external surface of a cover glass-based article (e.g., facing the exterior of the mobile electronic device), can help achieve a target degree of fragmentation, or tendency for bifurcation. In particular, to achieve low probability of bifurcations, in one or more embodiments of the present disclosure the parameter $K_t$ should not exceed 1.75$K_{IC}$ as a conservative criterion, and it should not exceed 2.25$K_{IC}$ as a non-conservative criterion (where a small but tolerable number of bifurcations, on the order of 1 per cm$^2$, is possible).

In the above, $K_{IC}$ is the fracture toughness of the glass-based composition utilized to form the glass-based article comprising the tension region whose parameter $K_t$ is being considered. These limits reflect a range of variation of the critical value of $K_t$ with variation in the stress profile shape. For example, it has been determined that while $K_t$ and TSE correlate strongly with the degree of fragmentation and crack branching upon careful fracture using a sharp tip, the critical values of $K_t$ and TSE at which crack bifurcations start to occur on the scale of tens of ~25 cm$^2$ of glass area depends somewhat on the stress profile, and, in particular, on whether a large portion of the tension region (such as 40% or higher) has constant tension, or not.

Furthermore, it has been observed that profiles for which the compression layers form a relatively large fraction of the total thickness (with tension layers having a smaller fraction such as 60-80% instead of 90%), tend to show bifurcations at higher values of the parameter $K_t$, intending to be in the upper half of the range defined by the conservative and non-conservative criteria stated above. The fracture toughness in terms of which the critical values of the parameter $K_t$ are defined is measured in conditions that substantially prevent crack fatigue due to moisture during the test. Otherwise the relevant fracture toughness could be under-estimated by 5-10% as a result of fatigue. If conditions of fatigue avoidance cannot be established, then a correction assuming 5% of under-estimate of fracture toughness is recommended, setting the conservative criterion to $K_t \leq 1.83 K_{IC}^{app}$, and the non-conservative criterion to $K_t \leq 2.36 K_{IC}^{app}$, where a superscript "app" was appended to the fracture toughness to signify "apparent fracture toughness". For most typical chemically strengthened glasses representing the current state-of-the art, the conservative criterion translates to $K_t \leq 1.09$ MPa$\sqrt{m}$ to $K_t \leq 1.44$ MPa$\sqrt{m}$ (for the common range of fracture toughness 0.73+/−0.1 MPa$\sqrt{m}$).

In one or more embodiments, the conservative criterion can have $K_t$ higher than 1.44 MPa$\sqrt{m}$ when fracture toughness of the glass is particularly high, over 0.83 MPa$\sqrt{m}$, and especially for some glass-ceramics that can have fracture toughness much higher than 0.83 MPa$\sqrt{m}$, such as greater than or equal to 1 MPa$\sqrt{m}$, greater than or equal to 1.2 MPa$\sqrt{m}$, or greater than or equal to 1.3 MPa$\sqrt{m}$. The non-conservative criterion translates to the range $K_t \leq 1.42$ MPa$\sqrt{m}$ to $K_t \leq 1.87$ MPa$\sqrt{m}$ and refers generally to tension-zone stress profiles in which at most a negligible fraction represents constant tension. Also, it may represent such profiles where said tension zone comprises substantially less than 70% of the thickness of the glass article.

Examples of tensile-strain energy TSE (assigned to the total of x and y dimensions) that correspond to the above conservative and non-conservative criteria include $$TSE \leq 15 \frac{J}{m^2}$$

for glass-based articles with relatively low fracture toughness around $$0.64 \text{ MPa}\sqrt{m}, \quad TSE \leq 19 \frac{J}{m^2}$$

for glass-based articles with most typical fracture toughness around 0.73 MPa$\sqrt{m}$ such as soda-lime, an alkali aluminosilicate glass, and commercially available glass A, and $$TSE \leq 24 \frac{J}{m^2}$$

for glasses on the high-end of the fracture-toughness range, with $K_{IC}$ slightly above 0.8 MPa$\sqrt{m}$. The non-conservative criterion has critical levels of the TSE not exceeding about 22, 28, and $$35 \frac{J}{m^2},$$

respectively. In embodiments, an alkali aluminosilicate glass comprises: about 60 mol % to about 70 mol % $SiO_2$; about 6 mol % to about 14 mol % $Al_2O_3$; 0 mol % to about 15 mol % $B_2O_3$; 0 mol % to about 15 mol % $Li_2O$; 0 mol % to about 20 mol % $Na_2O$; 0 mol % to about 10 mol % $K_2O$; 0 mol % to about 8 mol % MgO; 0 mol % to about 10 mol % CaO; 0 mol % to about 5 mol % $ZrO_2$; 0 mol % to about 1 mol % $SnO_2$; 0 mol % to about 1 mol % $CeO_2$; less than about 50 ppm $As_2O_3$; and less than about 50 ppm $Sb_2O_3$; wherein 12 mol % $Li_2O+Na_2O+K_2O$ 20 mol % and 0 mol % MgO+CaO 10 mol %. Commercially available glass A comprised (in mol %) 66.16% $SiO_2$, 10.29% $Al_2O_3$, 14.0% $Na_2O$, 2.45% $K_2O$, 0.6 $B_2O_3$, 0.21% $SnO_2$, 0.58% CaO, 5.7% MgO, 0.0105% $ZrO_2$, and 0.0081% $Fe_2O_3$.

Some experimental examples in the present disclosure demonstrate avoidance of crack bifurcations, conformed to the non-conservative criteria for avoiding bifurcations, and in some cases conformed to the conservative criteria. These conclusions are based on estimating the parameter $K_t$ and the tensile-strain energy based on the measurements of peak tension in the tension region, the depth of compression from the surface, and the relatively precise calculation for the other (deeper) end of said tension region based on the relatively narrow compression spike at the other end of said tension zone, as disclosed in the examples.

In another aspect of the present disclosure, according to some embodiments, a crack initiated by a sharp tool in an upper portion of a glass-based article penetrates through an upper compression region into an adjacent closest tensile-stress region, and starts spreading under the combined effect of localized tensile stress produced in the vicinity of the sharp tip, and the tension in the tensile-stress region closest to the surfaces penetrated by the tip. Then the crack spreads sideways and self terminates once the tips of the crack reach far away from the origin where the tool-induced tensile stresses are not significant. Conditions where this desired effect of crack self-termination is possible have been determined. According to some embodiments, the required condition is that the tensile-stress intensity parameter $K_t$ of the tension region nearest the penetrated surface not exceed about $1.45 K_{IC}$, preferably not exceed $1.2 K_{IC}$, and more preferably not exceed $1.0 K_{IC}$ of the glass-based composition utilized to form the glass-based article including the tension region. The example in the present disclosure where crack self-termination was observed did conform to the condition $K_t \leq 1.2 \ K_{IC}$. Furthermore, in some embodiments it may be preferred that the tension zone closest to penetrated surface have further lower tensile-stress intensity parameter $K_t \leq 0.8 K_{IC}$ or $K_t \leq 0.65 K_{IC}$ to help increase the probability of crack self-termination even when the cover glass-based article is subjected to energetic penetration event, such as a drop on a rough surface. According to some embodiments, corresponding exemplary values for limiting values of $K_t$ include 1.04 MPa$\sqrt{m}$, 0.85 MPa$\sqrt{m}$, 0.57 MPa$\sqrt{m}$, or 0.46 MPa$\sqrt{m}$, respectively, assuming a glass-based article of most typical fracture toughness. Similarly, in some embodiments, the condition promoting crack self-termination may also be defined in terms of TSE, where the TSE of said tension region nearest the penetrated surface is lower than $$10 \frac{J}{m^2},$$

lower than $$8 \frac{J}{m^2},$$

lower than $$6 \frac{J}{m^2},$$

or lower than $$4 \frac{J}{m^2},$$

representing increased ability to achieve crack self-termination, respectively.

Taking into account the provided definitions of critical parameter values that can predict ability for crack bifurcation, one embodiment of the present disclosure comprises a glass-based article (e.g., a glass sheet or a glass-ceramic sheet) having an interior compression region separating a first tension region from a second tension region, where it is possible to penetrate the first tension region and generate a sideways (i.e. laterally) propagating crack, in such a way that the crack does not bifurcate within a range of about 17 mm from the origin (the penetration location). This is demonstrated in the examples using discs having a diameter in the range 35-38 mm where crack bifurcations were avoided even though conditions of chemical strengthening were used that would have rendered the thick article frangible (producing many bifurcations) had the interior layer of compression been omitted.

Taking into account the further provided definitions of critical parameter values that can predict the ability for crack self-termination, one or more embodiments of the present disclosure comprises a glass-based article (e.g., a glass sheet or a glass-ceramic sheet) having an interior compression region separating a first tension region from a second tension region, where it is possible to penetrate the first tension region with a sharp tool and generate a sideways (i.e. laterally) propagating crack, in such a way that the crack self-terminates before reaching the edge of the glass sheet, which edge is located more than 10 mm away from the penetration location, preferably more than 15 mm away from the penetration location. This is demonstrated in the examples using discs having a diameter in the range 35-38 mm where a crack self-termination was observed even though conditions of chemical strengthening were used that would have normally caused any crack penetrating through to the tension interior to fully propagate sideways (i.e. laterally) had the interior narrow layer of compression been omitted. In some examples herein, the peak tension in the tension zone was at least 53 MPa, and the thickness of the glass article was 1.3 mm. With these parameters, a normal chemically strengthened cover-glass article would not enable observation of crack self-termination, even with very slow penetration using a very sharp tool.

Described herein are strengthened glass-based articles that include glasses, such as silicate glasses including alkali-containing glass, and glass-ceramics that may be used as a cover glass or a housing for mobile electronic devices, wearable electronic devices and touch-enabled displays. The glass-based articles may also be used in displays (or as display articles) (e.g., billboards, point of sale systems, computers, navigation systems, and the like), architectural articles (walls, fixtures, panels, windows, etc.), transportation articles (e.g., in automotive applications, trains, aircraft, sea craft, etc.), appliances (e.g., washers, dryers, dishwashers, refrigerators and the like), or any article that requires some fracture resistance.

In some embodiments, the glass-based articles described herein are chemically strengthened by ion exchange and exhibit stress profiles that are distinguished from those exhibited by known strengthened glass articles. In this disclosure, glass-based articles are formed by bonding glass-based substrates, and the glass-based substrates may have been previously strengthened (by, for example, thermal strengthening or ion exchange). In an ion exchange process, ions at or near the surface of the glass-based article are replaced by—or exchanged with—larger ions having the same valence or oxidation state. In those embodiments in which the glass-based article comprises an alkali aluminosilicate glass, ions in the surface layer of the glass and the larger ions are monovalent alkali metal cations, such as $Li^+$ (when present in the glass-based article), $Na^+$, $K^+$, $Rb^+$, and $Cs^+$.

Ion exchange processes are typically carried out by immersing a glass-based substrate in a molten salt bath (or two or more molten salt baths) containing the larger ions to be exchanged with the smaller ions in the glass-based substrate. It should be noted that aqueous salt baths may also be utilized. In addition, the composition of the bath(s) according to one or more embodiments includes more than one type of larger ion (e.g., Na+ and K+). It will be appreciated by those skilled in the art that parameters for the ion exchange process, including, but not limited to, bath composition and temperature, immersion time, the number of immersions of the glass-based article in a salt bath (or baths), use of multiple salt baths, additional steps such as annealing, washing, and the like, are generally determined by the composition of the glass-based article (including the structure of the article and any crystalline phases present) and the desired DOC and CS of the glass-based article that results from strengthening. By way of example, ion exchange of glass-based substrates may be achieved by immersion of the glass-based substrates in at least one molten bath containing a salt such as, but not limited to, nitrates, sulfates, and chlorides of the larger alkali metal ion. Typical nitrates include $KNO_3$, $NaNO_3$, $LiNO_3$, and combinations thereof. The temperature of the molten salt bath typically is in a range from about 350° C. up to about 480° C., while immersion times range from about 15 minutes up to about 100 hours depending on glass thickness, bath temperature and glass (or monovalent ion) diffusivity. However, temperatures and immersion times different from those described above may also be used.

In one or more embodiments, the glass-based substrates may be immersed in a molten salt bath of 100% $NaNO_3$ or 100% $KNO_3$ having a temperature from about 350° C. to about 480° C. for times ranging from about 15 minutes up to about 100 hours depending on glass thickness, bath temperature and glass (or monovalent ion) diffusivity. In the molten baths described in this disclosure, all percentages are percent by weight. In some embodiments, the glass-based substrate may be immersed in a molten mixed salt bath having a temperature from about 350° C. to about 480° C. and including from about 5% to about 90% $KNO_3$ and from about 10% to about 95% $NaNO_3$ for times ranging from about 15 minutes up to about 100 hours depending on glass thickness, bath temperature and glass (or monovalent ion) diffusivity.

Referring now to FIG. 3A, an embodiment of a glass-based article 400 is illustrated. In specific embodiments, the strengthened glass-based article 400 is a glass-based substrate which has been chemically strengthened. The glass-based article 400 has an external surface 405 and an internal surface 425 opposite the external surface 405 defining a thickness (t). In one or more embodiments, each of the external surface 405 and internal surface 425 may be ion exchanged to provide two regions of the glass-based article, which may be a first outer region 410 and a second outer region 420. When the glass-based article is utilized as a cover for a mobile electronic device such as a mobile phone or a tablet, the external surface 405 is exposed to a user of the electronic device and is susceptible to sharp impact damage when the device is dropped, while the internal surface 425 faces the electronic device.

According to one or more embodiments, the glass-based article 400 has a surface such as the external surface 405 and the internal surface 425. The glass-based article 400 also has a thickness (t). The glass-based article 400 has an outer region, for example first outer region 410 extending from the external surface 405 to a depth of compression and second outer region 420 extending from the internal surface 425 to a depth of compression. In one or more embodiments, the outer region is under a neutral stress or a first compressive stress. The glass-based article further includes a core region 430 that contains a region under a second compressive stress, the second compressive stress defining a compression peak having a maximum compression value and a maximum width at zero stress in a range of from about 1 micrometer to about 200 micrometers. According to one or more embodiments, the glass-based article 400 may have an intermediate region (discussed further in FIG. 5) disposed between the surface and the core region 430, wherein the intermediate region is under a tensile stress.

Referring to FIG. 3B, one or more embodiments of a laminated glass-based article 500 can comprise a pair of glass-based substrates, namely, a first substrate 510 and a second substrate 520 laminated together. The laminated glass-based article 500 has a surface, for example an external surface 505 and an internal surface 525 defining a thickness (t). When the glass-based article is utilized as a cover for a mobile electronic device such as a mobile phone or a tablet, the external surface 505 is exposed to a user of the electronic device and is susceptible to sharp impact damage when the device is dropped, while the internal surface 525 faces the electronic device. The first substrate 510 and the second substrate 520 can be bonded together by a bonding region 530, which may comprise covalent bonding, a Si—O—Si bond, bonding with a polymer, or a spin-on glass can bond the glass-based substrates 510 and 520 together. The laminated glass-based article may be symmetrical or asymmetrical depending on the application. "Symmetrical" refers to embodiments in which the thickness of the first substrate and the second substrate 520 are approximately equal and the stress profiles of the first substrate and the second substrate are substantially the same. The term "asymmetrical" refers to embodiments in which the thickness of the first substrate and the second substrate 520 are different and/or the stress profiles of the first substrate and the second substrate are different. The laminated glass-based article may be further exposed to optional treatments such as heat and/or chemical treatment.

Referring now to FIG. 4, another aspect of this disclosure pertains to devices that include the glass-based articles described herein, for example, the glass based articles shown in FIG. 3A and FIG. 3B. For example, the devices may include any device including a display 613 or requiring strengthened thin glass as described above. As shown in FIG. 4, an exemplary embodiment of an electronic device 603 may include a glass-based article according to one or more embodiments described herein. The device 603 includes a housing 620 having front 640, back 660, and side surfaces 680; electrical components (not shown) that are at least partially inside or entirely within the housing and including at least a controller, a memory, and a display 613 at or adjacent to the front surface of the housing. The glass-based article may be a cover disposed at or over the front surface of the housing such that it is over the display 613. In some embodiments, the glass-based article may be used as the housing 620 or as a portion of the housing 620.

Figure 5:
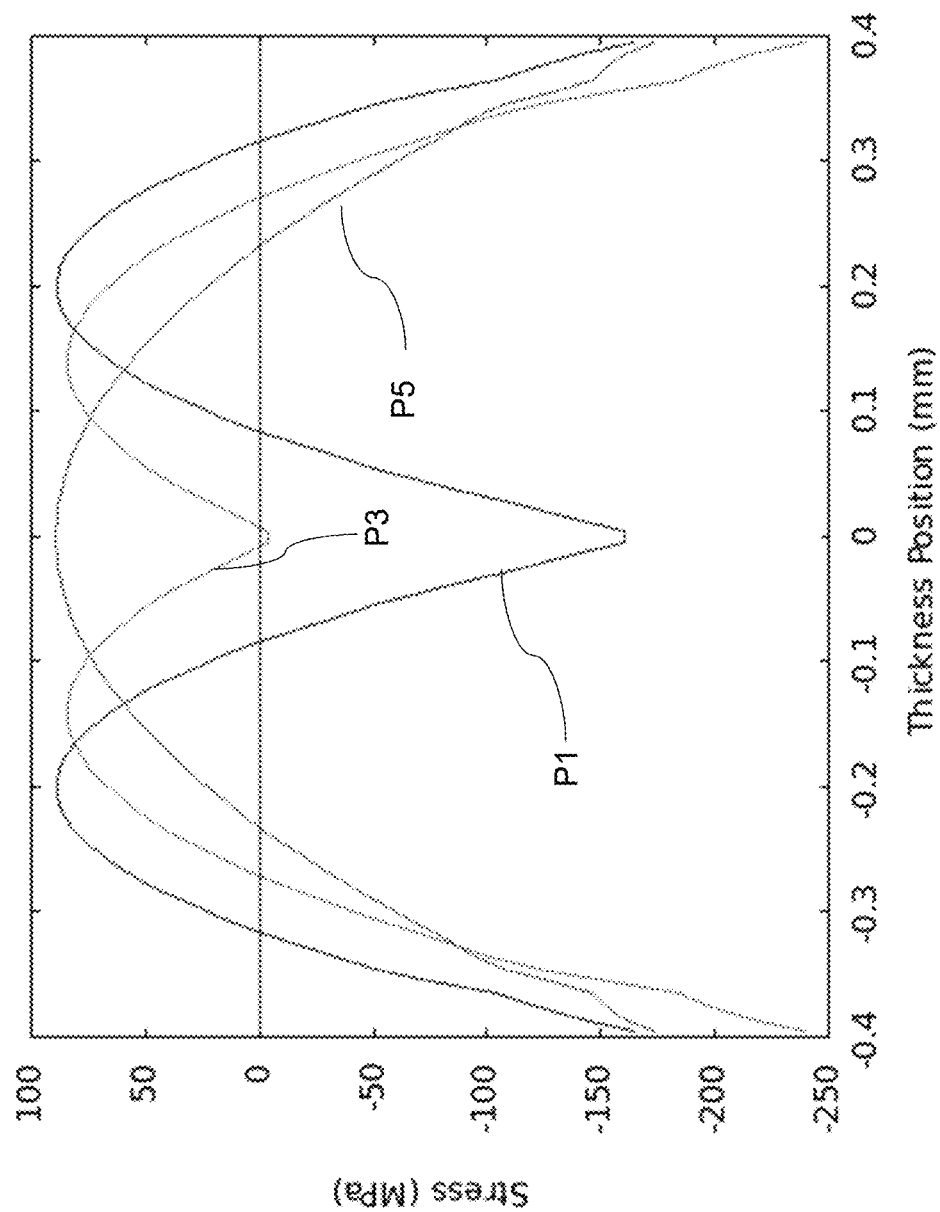
FIG. 5 illustrates exemplary stress profiles in accordance with one or more embodiments.

FIG. 5 illustrates three different embodiments of residual stress profiles each having approximately the same stored tension energy. The stress profiles shown in FIG. 5 are expected to be approximately symmetrical. The stress profiles are shown with compressive stress expressed as a negative value and tensile stress as a positive value on the Y-axis and position along the thickness of the substrate on the X-axis. The stress profiles shown in FIG. 5 are approximately symmetrical. Profile (P1) has a large compressive stress zone in the center of the thickness (at 0 thickness on the X-axis) approximately equal in magnitude to the surface compressive stress (at thickness −0.4 and 0.4), and according to one or more embodiments, this compression acts to confine the crack propagation. Profile (P3) has zero stress in the very center of the thickness (0 thickness on the X-axis) with compressive zones at the surfaces (−0.4 and 0.4 on the X-axis) on either side with slightly more compressive surface stress than P1. According to one or more embodiments, this lack of tensile stress in the center will help to mitigate excessive crack branching when a crack is initiated. Profile (P5) is a typical parabolic stress profile like that of a tempered glass (similar to FIG. 1), and is shown for comparison purposes. The peak tensile stress in all profiles shown in FIG. 5 is around 88 MPa. Profile (P5) has the deepest depth of compression (DOC) while profile (P1) has the shallowest.

Figure 6:
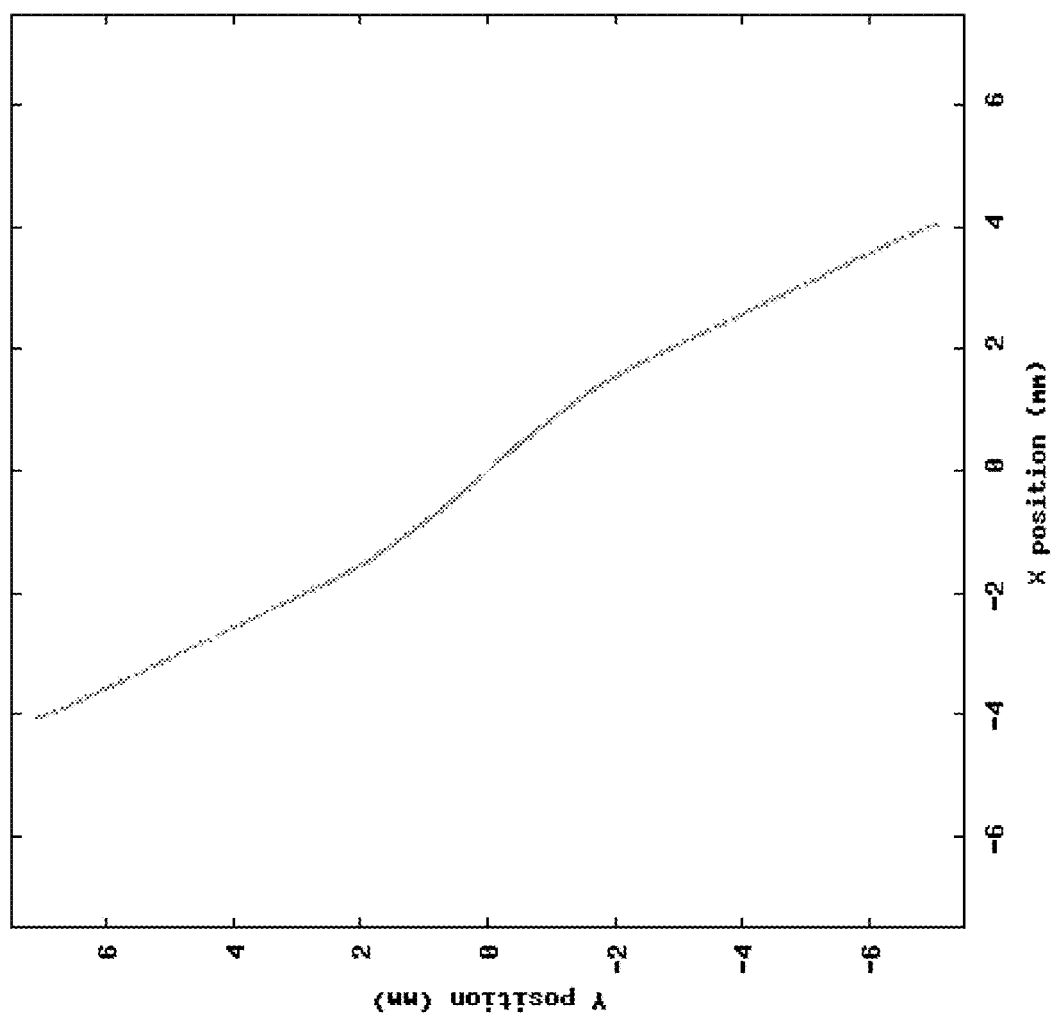
FIG. 6 is a graph which illustrates crack simulation behavior of one of the stress profiles of FIG. 5.
Figure 7:
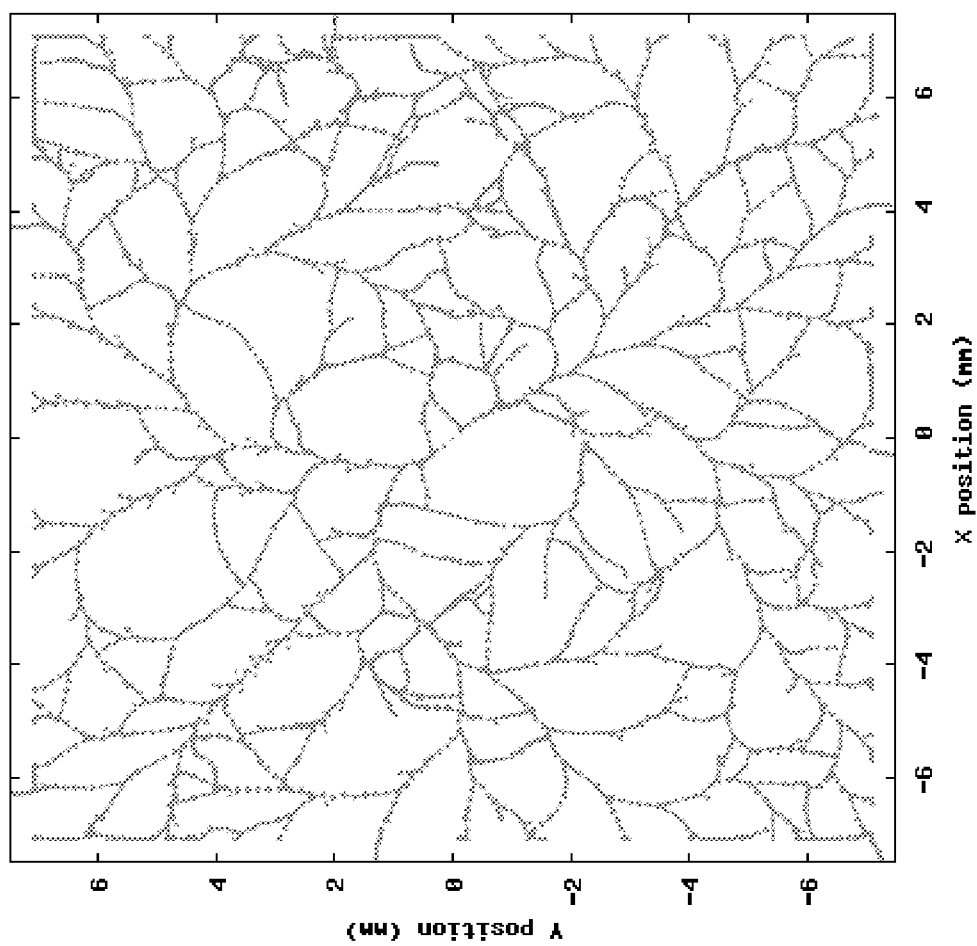
FIG. 7 is a graph which illustrates crack simulation behavior of one of the stress profiles of FIG. 5.
Figure 8:
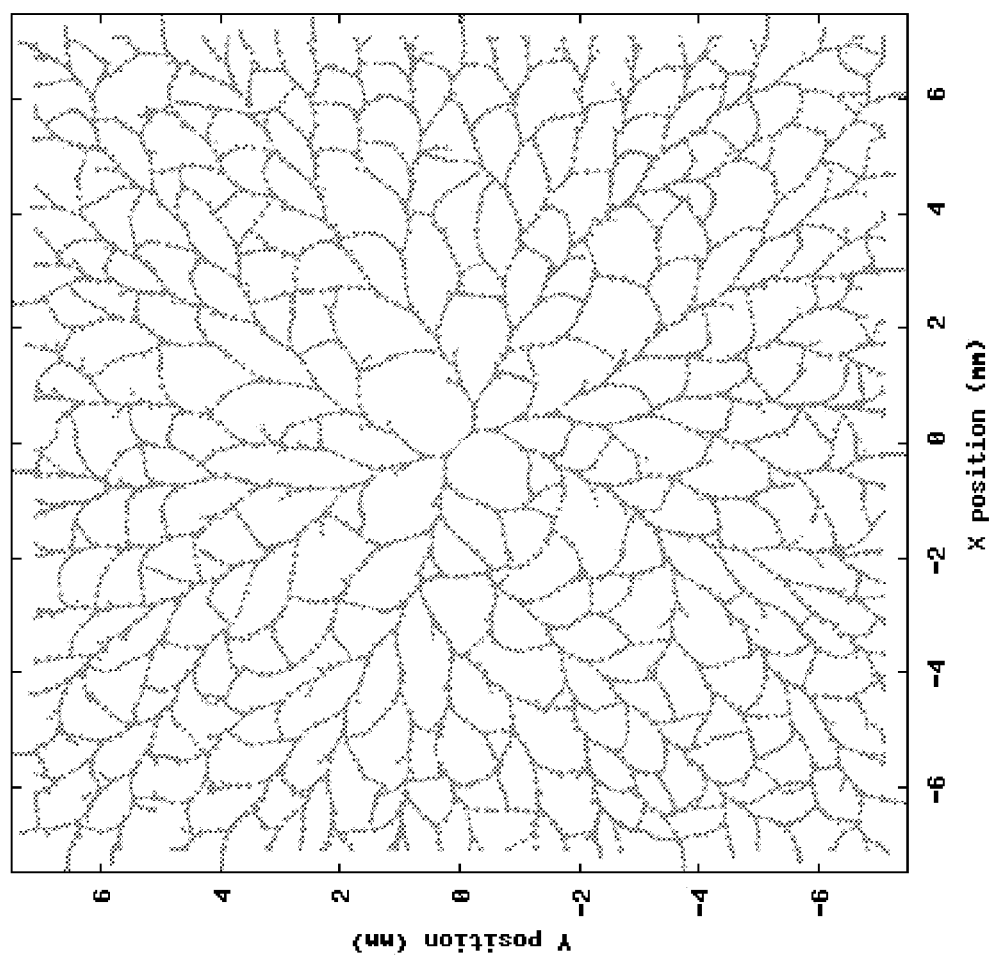
FIG. 8 is a graph which illustrates crack simulation behavior of one of the stress profiles of FIG. 5.

FIGS. 6, 7 and 8 shows results from a dynamic simulation analysis of crack behavior using Peridynamic theory. The simulation was performed to verify that stress profiles (P1) and (P3) from FIG. 5 will successfully slow a crack speed of sideways (i.e. lateral) growth and as a result, also reduce the number of fragments produced by crack division. The model size was 15 mm×15 mm×0.8 mm and three different models were made each with a different residual stress profile shown in FIG. 5. Each of these profiles has the same amount of stored tensile energy at about 22 J/m$^2$ per unit sheet area. The material dynamic toughness used was the same for each model at 13.9 J/m$^2$.

Initial flaws were applied into a tension region in the models to allow the stored tensile-strain energy to drive crack propagation. Profile (P5) had a flaw that reached from the surface down to the center of the glass sheet, while the other profiles had centrally located flaws to initiate fracture symmetrically in both tension zones. FIGS. 6, 7 and 8 show the crack fronts every tenth of a microsecond. The simulations showed that profile (P1) having a central compression region in FIG. 6 propagates the crack slowly, and each crack stays confined to the separated or divided tension regions. For profile (P3) in FIG. 7, the central lack of tension provides a retarding effect to the crack propagation. Profile (P5) in FIG. 8 was observed to quickly bifurcate the crack starting at 0.2 microseconds as the entire tension region is easily available for crack propagation, acceleration and branching. The simulations showed that even after 1.6 microseconds, profile (P1) does not bifurcate but Profile (P3) produced bifurcations within 0.8 microseconds, nucleating at the depth of maximum tension, growing toward the compressive regions more slowly. However, most of these bifurcations were quickly arrested as the material relaxed around the main crack. As these cracks are allowed to propagate throughout the entire glass sheet, it is readily observed, in comparing FIGS. 6, 7 and 8 that profile (P5) had a very high fragment density while the crack in profile (P1) never branched, and profile (P3) initially showed large sized fragments and a lower fragment density than profile (P5), however as time advanced previously arrested branches continued to propagate, which further split many of the already formed fragments.

Figure 9:
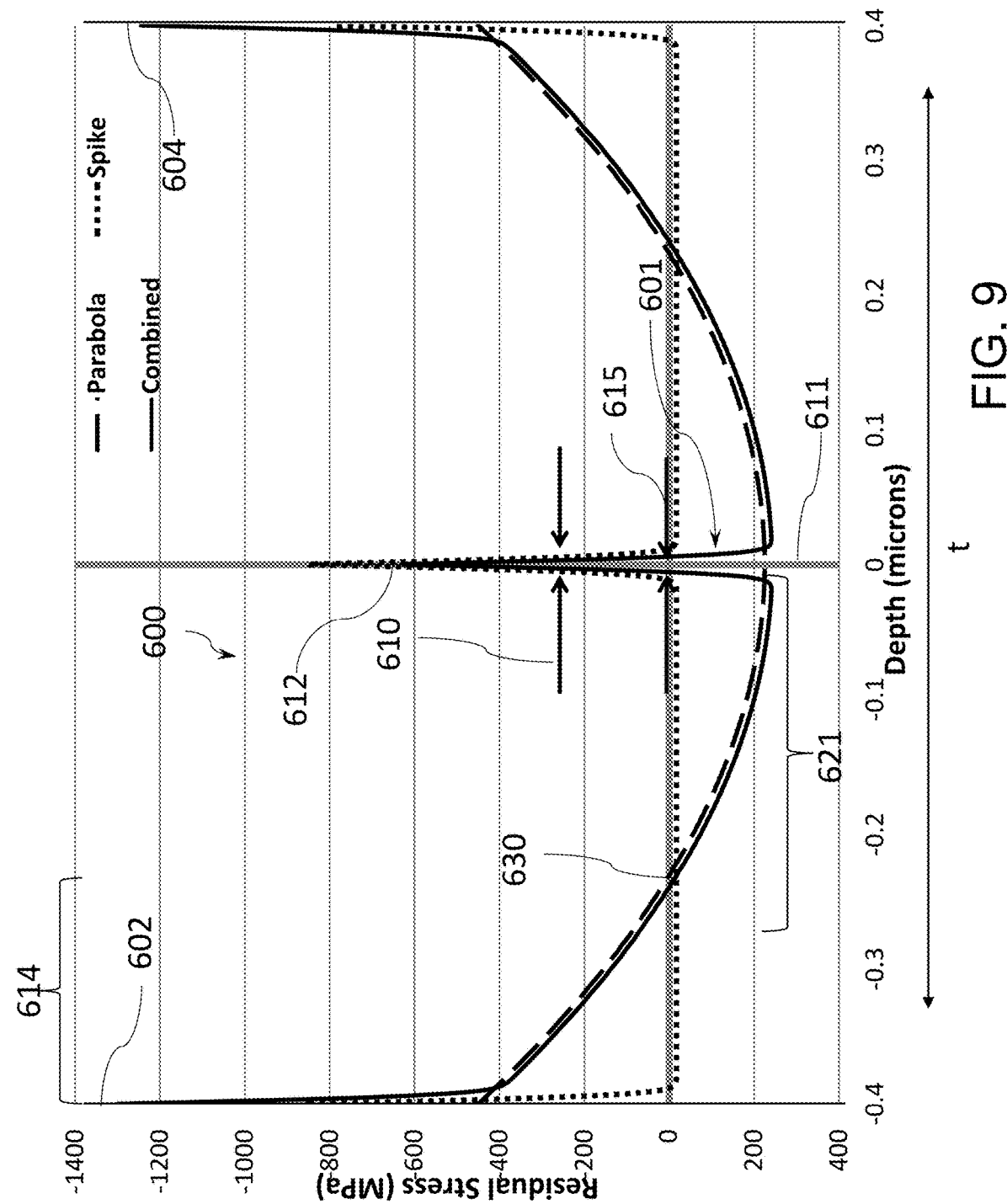
FIG. 9 illustrates an embodiment of a stress profile for a glass-based article.
Figure 10:
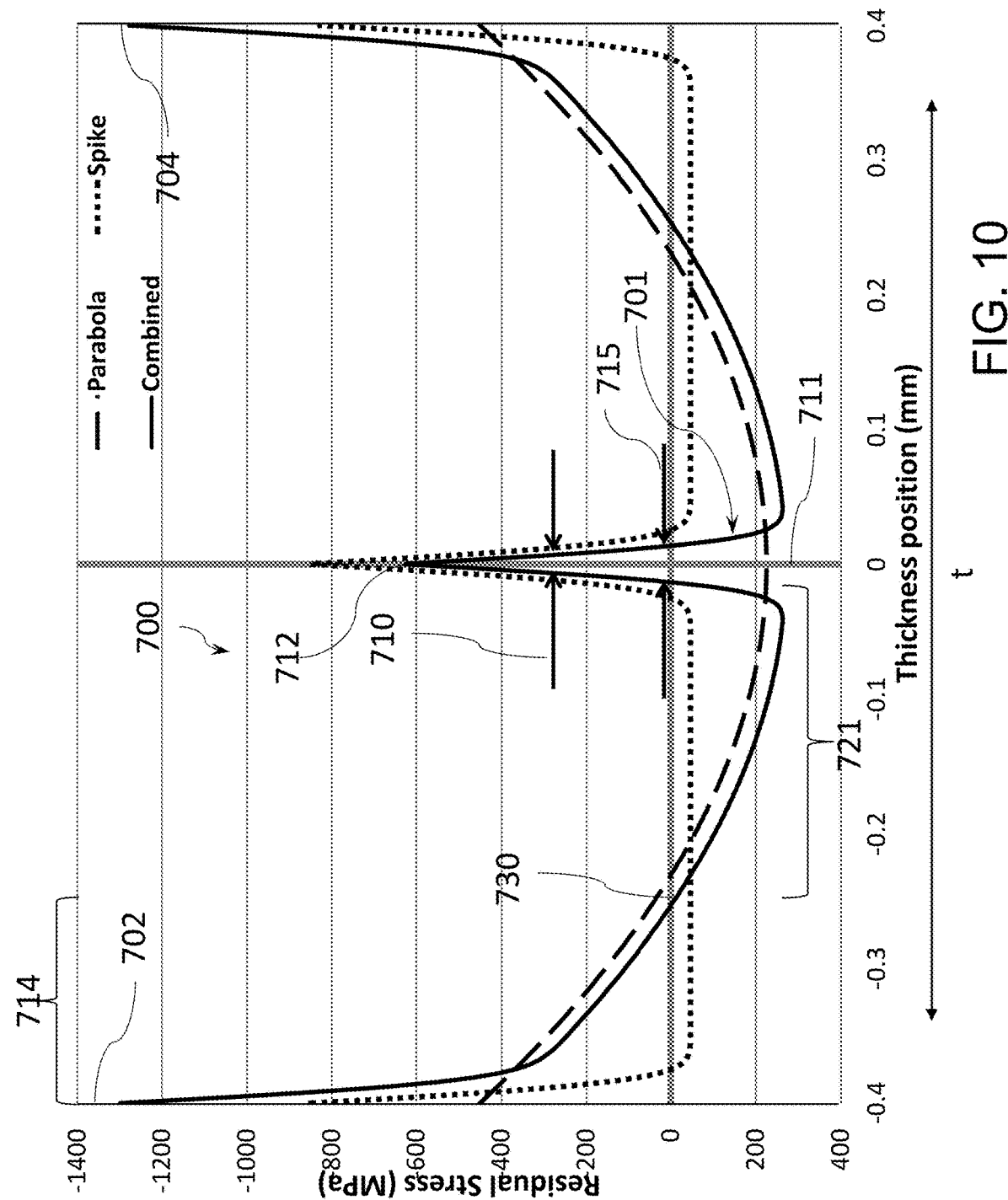
FIG. 10 illustrates an embodiment of a stress profile for a glass-based article.
Figure 11:
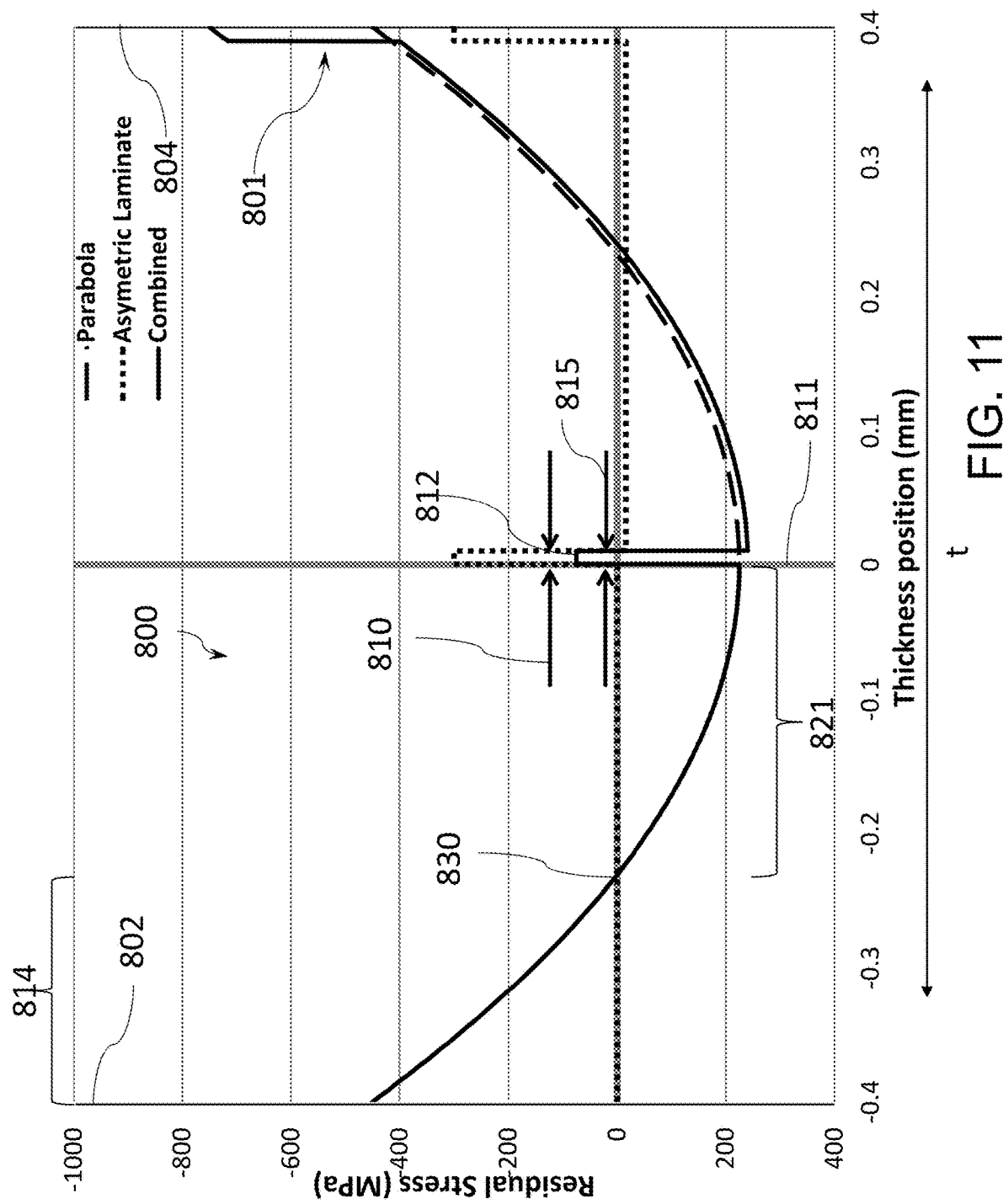
FIG. 11 illustrates an embodiment of a stress profile for a glass-based article.

FIGS. 9, 10 and 11 show exemplary stress profiles according to various embodiments of the disclosure. FIGS. 9 and 10 are the superposition of two standard ion exchange error function profiles that are added to a parabolic profile. FIG. 11 is the superposition of a laminate profile and a bonded profile.

Referring now to FIG. 9, which is an exemplary stress profile that can be created by laminating two 0.4 mm pieces of alkali aluminosilicate glass containing lithium and conducting potassium for lithium ion exchange on both pieces. The pieces can then be bonded by covalent bonding, as described further below, or by other methods. Thus, FIG. 9 shows a stress profile 601 for a glass-based article 600 having a surface 602 and a thickness (t). The glass-based article comprises an outer region 614 extending from the surface 602 to a depth of compression (DOC) 630 at which the stress profile 601 turns from compressive to tensile. The stress at the outer region 614 is under a first compressive stress. The glass-based article 600 further comprises a core region 610 under a second compressive stress, the second compressive stress defining a compression peak 612 having a maximum compressive stress value and a maximum width 615 at zero stress in a range of from about 1 micrometer to about 200 micrometers. The glass-based article 600 further comprises an intermediate region 621 disposed between the surface 602 and the core region 610, wherein the intermediate region 621 is under a tensile stress as shown.

In one or more embodiments, the stress profile 601 for the glass-based article 600 in FIG. 9 is such that the compression peak 612 has a maximum width at zero stress in a range of from about 5 micrometers to about 200 micrometers. In alternative embodiments, the width of the compression peak 612 has a width at zero stress in the range of from about 10 micrometers to about 40 micrometers.

In one or more embodiments, the outer region 614 of the glass-based article 600 is under the first compressive stress defining a surface compressive stress. In one or more embodiments, the compression peak 612 has a maximum compressive stress that is at least 90%, such as at least 80%, at least 70%, at least 60%, at least 50%, at least 40%, at least 20% or at least 10% of the surface compressive stress. According to one or more embodiments, the surface compressive stress is in a range of 300 MPa to 1200 MPa, such as in a range of from 600 MPa to 1000 MPa.

As can be seen from FIG. 9, the glass-based article 600 includes the core region 610 comprising an increasing stress region extending from zero stress to the compression peak 612 such that all points of the increasing stress region comprise a tangent having a value that is in a range of from 20 MPa/micrometer to 200 MPa/micrometer. The core region 610 further has a decreasing stress region extending from the compression peak 612 to zero stress such that all points of the decreasing stress region comprise a tangent having a value that is in a range of from −20 MPa/micrometer to −200 MPa/micrometer. FIG. 9 includes a parabolic profile shown as a dashed line on the graph for comparison, and the dotted line shows the profile that results when two chemically strengthened glass-based substrates area laminated together before additional thermal or chemical tempering.

According to one or more embodiments, the stress profile 601 of the glass-based article 600 is such that the first compressive stress region defines a depth of compression (DOC) where the glass-based article has a stress value of zero, the DOC being in a range of 0.05·t and 0.30·t. In one or more embodiments, the tensile stress in the intermediate region 621 has a maximum tensile stress absolute value of less than an absolute value of the maximum compressive stress value of the compression peak 612. In one or more embodiments, the thickness (t) of the glass-based article is in a range of 0.1 mm to 3.0 mm, for example, 0.1 mm to 2.9 mm, 0.1 mm to 2.8 mm, 0.1 mm to 2.7 mm, 0.1 mm to 2.6 mm, 0.1 mm to 2.5 mm, 0.1 mm to 2.4 mm, 0.1 mm to 2.3 mm, 0.1 mm to 2.2 mm, 0.1 mm to 2.1 mm, 0.1 mm to 2.0 mm, 0.1 mm to 1.9 mm, 0.1 mm to 1.8 mm, 0.1 mm to 1.7 mm, 0.1 mm to 1.6 mm, 0.1 mm to 1.5 mm, 0.1 mm to 1.4 mm, 0.1 mm to 1.3 mm, 0.1 mm to 1.2 mm, 0.1 mm to 1.1 mm, 0.1 mm to 1.0 mm, 0.1 mm to 0.9 mm, 0.1 mm to 0.8 mm, 0.1 mm to 0.7 mm, 0.1 mm to 0.7 mm, 0.1 mm to 0.6 mm, or 0.1 mm to 0.5, and any and all sub-ranges formed between these values.

In one or more embodiments, the glass-based article 600 has a stress profile 601 that results in stored tensile energy in the glass-based article, such that when damage is introduced into a surface of the glass-based article, the stress profile reduces crack bifurcations compared to a glass-based article having the same amount of stored tensile energy and not having the compression peak. In one or more embodiments, the core region 610 includes a mid-point 611 between the surface 602 and a second surface 604 opposite the surface 602 of the glass-based article 600.

The glass-based article 600 can comprise an alkali aluminosilicate glass, and in specific embodiments, wherein $Li_2O$ is present in the glass-based article in a range of 0.1 mol % to 20 mol %. In one or more embodiments, $B_2O_3$ is present in the glass-based article in a range of 0.1 mol % to 10 mol %. In one or more embodiments, $P_2O_5$ is present in the glass-based article in a range of 0.1 mol % to 10 mol %. In one or more embodiments, the glass-based article is substantially free or free of $K_2O$.

According to one or more embodiments of the glass based article, the stress profile is such that there in the compression peak is an aspect ratio of the maximum compressive stress (in MPa) to the maximum width at zero stress (in microns) that is greater than or equal to 2:1, greater than or equal to 2.5:1, greater than or equal to 3:1, greater than or equal to 3.5:1, greater than or equal to 4:1, greater than or equal to 5:1, greater than or equal to 6:1, greater than or equal to 7:1, greater than or equal to 8:1, greater than or equal to 9:1, greater than or equal to 10:1, greater than or equal to 11:1, greater than or equal to 12:1, greater than or equal to 13:1, greater than or equal to 15:1, greater than or equal to 20:1 or greater than or equal to 25:1, and any and all sub-ranges formed between these endpoints. According to one or more embodiments, the glass-based article has a stress profile that results in stored energy in the glass-based article that prevents cracks formed by surface-induced damage from penetrating through the entire thickness of the glass-based article.

FIG. 10 shows a stress profile 701 of a glass-based article 700 according to another embodiment. In FIG. 10, the surface 702 has a compressive stress and the stress profile 701 has a high depth of compression (DOC) 730. Thus, FIG. 10 shows a stress profile 701 for a glass-based article 700 having a surface 702 and a thickness (t). The glass-based article comprises an outer region 714 extending from the surface 702 to a depth of compression (DOC) 730 at which the stress profile 701 transitions from compressive to tensile stress. The outer region 714 is under a first compressive stress. The glass-based article 700 further comprises a core region 710 under a second compressive stress, the second compressive stress defining a compression peak 712 having a maximum compression value and a maximum width 715 at zero stress in a range of from about 1 micrometer to about 200 micrometers. The glass-based article 700 further comprises an intermediate region 721 disposed between the surface 702 and the core region 710, wherein the intermediate region 721 is under a tensile stress as shown. In one or more embodiments, the core region 710 includes a mid-point 711 between the surface 702 and a second surface 704 opposite the surface 702 of the glass-based article 700. In FIG. 10, the increased depth of compression in the profile results in a shallower DOC for the initial stress profile of the glass-based substrates shown in dotted lines compared to FIG. 9, which may not be desired. The surface compressive stress could be released or reduced if desired, such as by re-exchanging the lithium for potassium. FIG. 10 includes a parabolic profile shown as a dashed line on the graph for comparison, and the dotted line shows the profile that results when two substrates area laminated together before additional thermal or chemical tempering.

The stress profile shown in FIG. 11 demonstrates that a stress profile 801 (solid line) for the glass-based article 800 does not have to be fully symmetric with respect to the mid-plane of the compound article and the benefit of increased tensile strain energy without increased fragmentation can still be obtained. FIG. 11 shows a stress profile 801 for a glass-based article 800 having a surface 802 and a thickness (t). The glass-based article comprises an outer region 814 extending from the surface 802 to a depth of compression (DOC) 830 at which the stress profile 801 transitions from compressive to tensile stress. The stress at the outer region 814 is under a first compressive stress. The glass-based article 800 further comprises a core region 810 under a second compressive stress, the second compressive stress defining a compression peak 812 having a maximum compressive stress and a maximum width 815 at zero stress in a range of from about 1 micrometer to about 200 micrometers. The glass-based article 800 further comprises an intermediate region 821 disposed between the surface 802 and the core region 810, wherein the intermediate region 821 is under a tensile stress, as shown. In one or more embodiments, the core region 810 includes a mid-point 711 between the surface 802 and a second surface 804 opposite the surface 802 of the glass-based article 800. FIG. 11 includes a parabolic profile shown as a dashed line on the graph for comparison, and the dotted line shows the profile that results when two chemically strengthened glass-based substrates are laminated together before additional thermal or chemical tempering. While the profile shown in FIG. 11 shows a step change in stress from the core region 810 to the intermediate region 821, where there is an infinite slope and no transition region to the intermediate region 821 stress profile, in some embodiments, there is a transition region in which there is a gradual transition in the stress profile to the intermediate region 821.

The profile does not have to be fully symmetric to self-balance, but the profiles on the two sides should be selected so as to not cause unwanted warp. The fact that the profile does not have to be fully symmetric to self-balance and not warp could provide advantages because it does not affect the profile on the opposite side, which will be making contact with the rough surface during device drop events. An asymmetric profile would be advantageous, as the exposed surface often fails by deep damage introduction, while the inner surface rarely fails, and the failures that do happen are due to overstressing preexisting flaws.

Figure 13:
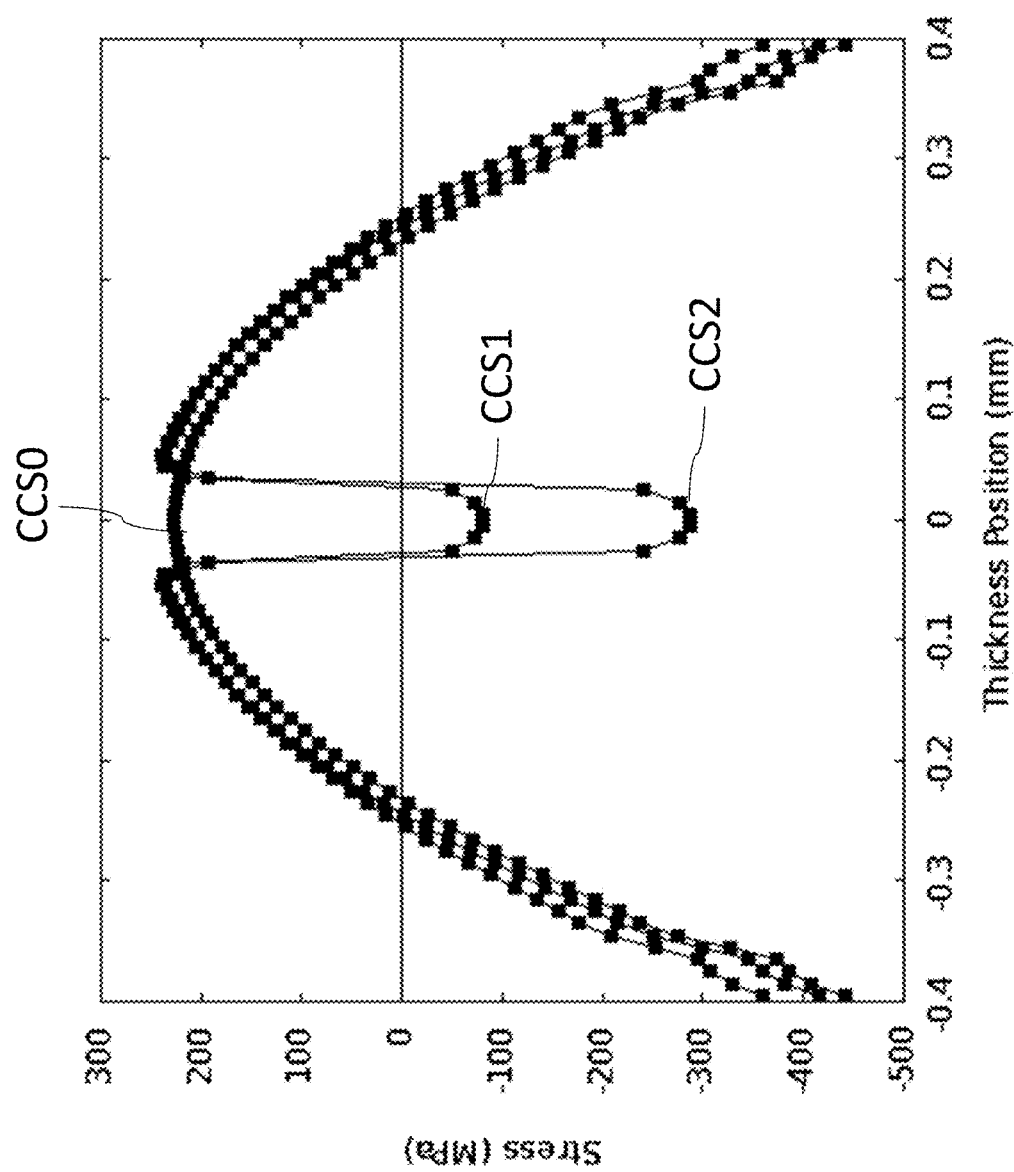
FIG. 13 illustrates an embodiment of a stress profiles for glass-based article compared with a parabolic stress profile.
Figure 14:
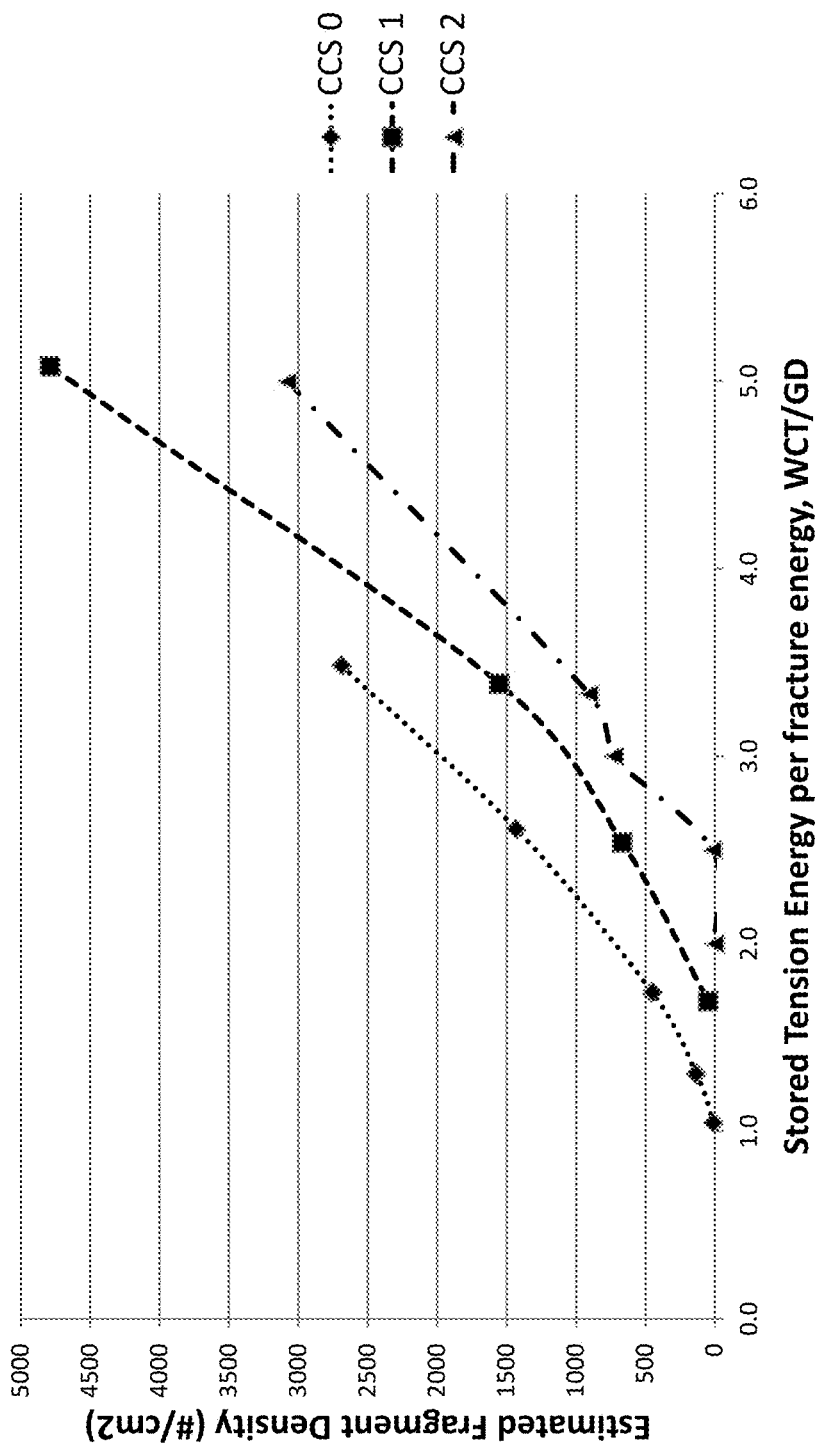
FIG. 14 illustrates modelling data for the stress profile of FIG. 13 of estimated fragment density versus stored tension energy per fracture energy.

FIG. 13 is plot of a parabolic residual stress profile (CCS0) having a high stored energy. Stress profile CCS1 shows a stress profile of a laminate with a similar stress profile to CCS0, however, with a core region having a compressive stress. CCS2 is similar to CCS1, except with a core region having a higher compressive stress. FIG. 14 depicts modeling data showing that the number of fragments is reduced with increasing compressive stress in the central region. With an increase in the central compressive stress (CCS) there is a higher tolerance for stored tension energy over fracture energy. With a smaller CCS (e.g., CCS1), the stored energy capacity increases about 50%, and with a large CCS (e.g., CCS2), the stored energy capacity increases by 100% (doubles). The stored energy capacity can be defined as the X-axis intercept in FIG. 14, or stated another way, it is the amount of stored energy at which any further increase in energy would cause fragmentation of the glass. Even at a given stored energy value, those profiles with CCS exhibit less fragmentation, the magnitude of which depends on the stored energy.

According to one or more embodiments, the glass-based articles described herein comprise a pair of glass-based substrates bonded together as described above with respect to FIG. 3B. The pair of glass-based substrates can be bonded together by covalent bonding, for example, wherein the covalent bonding comprises a Si—O—Si bond. According to one or more embodiments, covalent bonding is a bond that is a molecular bond that involves sharing of electron pairs, which are known as shared pairs or bonding pairs. According to one or more embodiments, covalent bonding may include α-bonding, π-bonding, metal-to-metal bonding, agostic interactions, bent bonds, and three-center two-electron bonds. Alternatively, the glass-based substrates can be bonded together with a polymer, a spin-on glass, or a frit. In some embodiments, glass-based substrates are ion exchanged and bonded with a frit.

Another aspect of the disclosure pertains to a method of making a glass-based article which comprises providing a first glass-based substrate having a surface, a thickness (t), and an outer region extending from the surface to a depth of compression, wherein the outer region has a first compressive stress at or near the surface and a decreasing stress region such that the first glass-based substrate has a parabolic stress profile. The method further comprises providing a second glass-based substrate having a surface, a thickness (t), and an outer region extending from the surface to a depth of compression, wherein the outer region has a second compressive stress at or near the surface and a decreasing stress region such that the second glass-based substrate has a parabolic stress profile. The method further comprises bonding the first glass-based substrate and the second glass-based substrate together at a bonding interface to provide the glass-based article having a compression peak in a central region of the glass-based article including the bonding interface.

In one or more method embodiments, the first glass-based substrate outer region has a first compressive stress at the surface and a decreasing stress region such that all points of the decreasing stress region comprise a tangent having a value that is in a range of −20 MPa/micrometer and −200 MPa/micrometer, and the second glass-based substrate has a compressive stress at the surface and a decreasing stress region such that all points of the decreasing stress region comprise a tangent having a value that is in a range of −20 MPa/micrometer and −200 MPa/micrometer. In some embodiments, the bonding utilizes an adhesive. In some embodiments, the bonding utilizes a frit. In one or more embodiments of the method, the bonding is conducted without the use of a polymer or adhesive.

One or more method embodiments includes heating the first glass-based substrate and the second glass-based substrate during bonding, for example, heating to a temperature and for a time sufficient to form a covalent bond between the first glass-based substrate and the second glass-based substrate. The heating can comprise heating to a temperature of at least about 400° C. for a period of time of at least 30 minutes. The resulting sample may be nearly perfectly bonded and almost impossible to separate.

In one or more embodiments, a process to bond the glass-based substrates can include cleaning the surfaces of the substrates with a high pH solution. For example, what is known as a RCA clean or SC1 process may be used. In one or more embodiments, a RCA clean process includes removal of organic contaminants (organic clean+particle clean), removal of a thin oxide layer (oxide strip, optional) and removal of ionic contamination (ionic clean). The substrates can be soaked in water, such as deionized water, and rinsed with water between each step. In one or more embodiments, the cleaning can include only a SC1 (referring to a standard clean process) process, which involves cleaning the substrates with a solution of deionized water and aqueous ammonium hydroxide (for example, 29% by weight $NH_3$) and hydrogen peroxide (for example, 30%). An exemplary SC1 solution can include 5 parts (by volume) water, 1 part ammonium hydroxide and 1 part aqueous hydrogen peroxide. The cleaning can occur at room temperature (for example, about 25° C.), or an elevated temperature in a range of 50° C. to 80° C. The substrates can be placed in the solution for 1 minute to 30 minutes. This solution cleaning removes organic residues and particles.

According to one or more embodiments, in addition to the SC1 process, an optional oxide strip process may be performed. This oxide strip process, according to one or more embodiments, includes immersion in a 1:100 or 1:50 solution of aqueous hydrofluoric acid at a temperature in a range of from 25° C. to 80° C. for a period of time from about fifteen seconds to about 5 minutes, in order to remove a thin oxide layer and some fraction of ionic contaminants. In one or more embodiments, a third step includes an ionic cleaning process. In an exemplary embodiment, a solution of water (e.g., deionized water), aqueous HCl (hydrochloric acid, for example 37% by weight) and aqueous hydrogen peroxide (for example, 30% by weight) is provided. An example of solution is 6 parts (by volume) deionized water, 1 part HCl and 1 part hydrogen peroxide. The substrates are placed in the solution at room temperature (for example, about 25° C.), or at an elevated temperature in a range of 50° C. to 80° C. The substrates can be placed in the solution for 1 minute to 30 minutes. This ionic cleaning treatment effectively removes the remaining traces of metallic (ionic) contaminants, some of which were introduced in the SC1 cleaning step. In an optional step, the substrates can be rinsed in water (such as deionized water). The cleaned substrates are then placed in a stack and heated to a temperature exceeding about 400° C. for about an hour with continually applied pressure to bond the laminates together and form a laminated glass-based article. The resulting laminated glass-based article will comprise the substrates bonded together.

Because of the high temperatures that may be required to form covalent bonds, it is possible that the bonding stage will result in additional ion diffusion within the ion exchanged glass, which may lower the magnitude of the central compressive stress, but increase the breadth of the central compressive stress region in the middle of the two sheets. However, the diffusion rate for potassium in lithium-containing glasses is low enough to make diffusion of potassium manageable. A second ion exchange may then be conducted comprising sodium for lithium ion exchange, and optionally also shallower potassium diffusion from the exposed outer surfaces. The fast diffusion of sodium allows formation of a deep stress profile from both sides of the bonded glass article, including a high amount of tensile strain energy. The spatial separation of the tension zone into two disconnected tensile-strain regions allows no formation of bifurcations in some cases despite the high total strain energy contained cumulatively in the two tension zones. In alternative method embodiments, the bonding is conducted with spin-on glass or a polymer. The method can further comprise ion-exchanging the bonded glass-based article.

In some embodiments, heat treating the bonded glass-based substrates can be utilized to modify the stress profile of the glass-based article. The heat treatment according to some embodiments can be in a range of from 280° C. to 500° C. to modify the stress profile.

In some embodiments, the glass-based articles can be formed by bonding a first glass-based substrate and a second glass-based substrate together by draw forming a first glass-based substrate having a first coefficient of thermal expansion and draw forming a second glass-based substrate having a second coefficient of thermal expansion, and bonding the first glass-based substrate and second glass-based substrate at or above the softening point of one of the first glass-based substrate and second glass-based substrate. The draw forming of the first glass-based substrate and the second glass-based substrate may occur simultaneously. After draw-forming and bonding the first glass-based substrate and second glass-based substrate, the glass-based article is cooled to form a core region of the glass-based article in compression and a cladding region of the glass-based article that is in tension. In some embodiments, the core region has a compressive stress greater than or equal to 100 MPa and to less than or equal to 1000 MPa, while the cladding has a tensile stress that is less than the value of the maximum compressive stress.

Another embodiment includes a glass-based article preform comprising a core region in compression and a cladding region in tension. In some embodiments, after bonding the first glass-based substrate and second glass-based substrate to form such a glass-based article preform, the glass-based article is thermally tempered. In one or more embodiments, the glass-based article preform is ion-exchanged after bonding, and in some embodiments, the glass-based article preform is thermally tempered and ion-exchanged after bonding. In some embodiments, the ion-exchange after bonding produces a tensile stress spike at the surface that exceeds 300 MPa and is less than 1200 MPa, the depth of the spike extending in a range of 3 micrometers to 30 micrometers from the surface of the glass-based article.

Exemplary glass-based substrates that could be utilized according to one or more embodiments comprises a pair of substrates, each having a nominal composition of 63.60 mol % $SiO_2$, 15.67 mol % $Al_2O_3$, 10.81 mol % $Na_2O$, 6.24 mol % $Li_2O$, 1.16 mol % ZnO, 0.04 mol % $SnO_2$, and 2.48 mol % $P_2O_5$ ion exchanged in a molten salt bath including 100% $NaNO_3$ and having a temperature of about 390° C. The ion exchange provides a parabolic stress profile. When two such substrates are laminated together, the laminated glass-based article would have a compressive stress peak in the center, similar to profile (P1) shown in FIG. 5. An optional additional thermal tempering or ion exchange could be utilized on the laminated substrates to achieve a deeper DOC or a larger surface compression to produce a product tailored to particular requirements.

The glass-based articles of the disclosure may be substantially planar, although other embodiments may utilize a curved or otherwise shaped or sculpted substrate. In some instances, the glass-based article may have a 3D or 2.5D shape. The glass-based article may be substantially optically clear, transparent and free from light scattering. The glass-based article may have a refractive index in the range from about 1.45 to about 1.55. As used herein, the refractive index values are with respect to a wavelength of 550 nm.

Additionally or alternatively, the thickness of the glass-based article may be constant along one or more dimension or may vary along one or more of its dimensions for aesthetic and/or functional reasons. For example, the edges of the glass-based article may be thicker as compared to more central regions of the glass-based article. Alternatively, the edges of the glass-based article may be thinner as compared to more central regions of the glass-based article. The length, width and thickness dimensions of the glass-based article may also vary according to the article application or use.

Using covalent bonding prior to the final strengthening of the compound glass-based article makes the full strengthening relatively simple, but presents some fabrication challenges related to the desire that there be no contaminant particles between the two glass-based substrates during bonding. Indeed, small particles with sizes as small as hundreds of nanometers can create macroscopic areas lacking bonding, and cause delamination or breakage of the compound article during the post-bonding chemical strengthening or thermal strengthening. This leads to a potential need to perform the bonding in cleanroom environment, using sophisticated cleaning procedures, which adds cost, and can create throughput limitations or need for significant investment in infrastructure.

To address these challenges, in another embodiment of the disclosure, the two substrates of the compound article are bonded using an adhesive, without requiring a cleanroom environment. If there is a requirement for substantial transparency of the cover-glass article, then the adhesive should be a clear adhesive or clear optical adhesive, with transparency adequate for meeting the overall transparency specification of the compound glass article after accounting for reflections and absorption in the glass components. If an adhesive is used that can withstand the high temperature and the corrosive action of the ion-exchange salts (such as $KNO_3$ and $NaNO_3$) during immersion ion exchange, a final chemical strengthening can be performed after bonding the parts of the compound article. On the other hand, it is in general possible to perform full chemical strengthening of the individual sheets prior to bonding. In this case the requirements for chemical and thermal stability of the one adhesive are substantially relaxed. For example, CRAZY GLUE® brand cyanoacrylate adhesive was used to demonstrate several embodiments of the disclosure. In addition, two glass parts were successfully bonded by using a clear epoxy (Loctite EA9017).

EXAMPLES

Example 1-2×0.65 mm Compound Article

The Examples below utilize combinations of substrates as follows:

SUBSTRATE 1—Made in accordance with U.S. Pat. No. 8,341,976 (having the composition 64.13 mol % $SiO_2$; 12.55 mol % $Al_2O_3$; 9.55 mol % $B_2O_3$; 13.59 mol % $Na_2O$; 0.01 mol % $K_2O$; 0.01 mol % MgO; 0.02 mol % CaO; and 0.12 mol % $SnO_2$ underwent ion-exchange by immersion in a molten $KNO_3$ bath for fifteen hours at 410° C.);

SUBSTRATE 2—Made in accordance with U.S. Pat. No. 8,951,927 (having a composition of 67.37 mol % $SiO_2$, 3.67 mol % $B_2O_3$, 12.73 mol % $Al_2O_3$, 13.77 mol % $Na_2O$, 0.01 mol % $K_2O$, 2.39 mol % MgO, 0.01 mol % $Fe_2O_3$, 0.01 mol % $ZrO_2$, and 0.09 mol % $SnO_2$);

SUBSTRATE 3—Made in accordance with U.S. Pat. No. 9,156,724 (57.43 mol % $SiO_2$, 16.10 mol % $Al_2O_3$, 17.05 mol % $Na_2O$, 2.81 mol % MgO, 0.003 mol % $TiO_2$, 6.54 mol % $P_2O_5$, and 0.07 mol % $SnO_2$); and SUBSTRATE 4—Made in accordance with U.S. Patent App. Pub. No. 2016/0102011A1 (63.60 mol % $SiO_2$, 15.67 mol % $Al_2O_3$, 10.81 mol % $Na_2O$, 6.24 mol % $Li_2O$, 1.16 mol % ZnO, 0.04 mol % $SnO_2$, and 2.48 mol % $P_2O_5$).

The compound article of this example comprised two disc-shaped sheets (samples A and B) of SUBSTRATE 4, each of thickness 0.65 mm. The sheets were each core-drilled to form circular discs with diameter of about 38 mm to guarantee that the sheets would warp into a spherical surface after asymmetric ion exchange. The full thickness of the compound article was about 1.3-1.4 mm, including a layer of glue of up to about 0.1 mm. The two substrate sheets were each individually strengthened asymmetrically as follows. First, the outer side of each pre-heated glass sheet (samples A and B) was spray-coated with a near-saturated solution comprising about 15% tri-potassium-phosphate (TKP), about 10% $NaNO_3$, and about 75% tri-sodium phosphate (TSP) for the salt part of the solution. After deposition on the pre-heated glass, the coating was dried, and the glass sheets were subjected to a heat treatment at 390° C. for 7 hours during which ion exchange occurred in the coated surfaces. Early during the heat treatment, some exchange of Na and K occurs between the TKP and the $NaNO_3$, such that some of the $NaNO_3$ is converted to $KNO_3$. After the first step the samples were washed and cleaned, and the other surface of the glass sheet (the inner surface) was coated with a water solution of a salt mixture having 92% TKP and 8% $KNO_3$ by weight, while the outer surface was coated with a near-saturated aqueous solution of a salt mixture having 85 wt. % TKP, 5 wt. % $KNO_3$, and 10 wt % $NaNO_3$. Care was taken to leave a narrow uncoated band around the periphery, to prevent the intermixing of the two types of coating salts. The double-coated glass sheet samples A and B were then subjected to a heat treatment at 380° C. for 30 min to induce penetration of a layer with high potassium concentration on the intended inside surface of the discs to a depth between about 8 and 11 microns, while the already formed K-enriched layer on the outside become a few microns deeper and with higher surface concentration. After the first ion-exchange step, each sheet warped with the intended outer surface becoming convex, and the intended inner surface becoming concave. This warp orientation remained unchanged during the subsequent ion exchange step(s), and only the magnitude of the warp changed. After the two glass sheets A and B were asymmetrically strengthened, the inner (concave) surface of each was cleaned, then the inner surfaces were quickly treated with cyanoacrylate CRAZY GLUE® and pressed against each other. The so formed glass-adhesive-glass sandwich was placed in a vice and pressed together until the component sheets A and B became substantially flat, and was held in the vice for about 8 minutes. Enough cyanoacrylate glue was used to result in full post-flattening coverage of the inner surfaces of the sheets, but not much more. If too much cyanoacrylate glue were used, the bond would not be effective because excessive cyanoacrylate glue would require much more moisture to set than the environment provides. The jaws of the vice were covered with sheets of paper to prevent the formation of high-pressure points that could crack the glass sheets during the flattening of the glass sandwich.

Examples 2 and 3

Using an almost identical process to Example 1, two more pairs of round samples of 0.65 mm glass of the same composition, SUBSTRATE 4, C1-C2 (Example 2), and D1-D2 (Example 3), were prepared and sandwiched. The only difference in the preparation was that after the first 7-hour ion-exchange step for the outer surfaces, the additional ion exchanges were separated for the inner and the outer surface. The inner surface was coated with 92 wt. % TKP+8% $KNO_3$ and heat-treated at 380° C. for 13 min, then cleaned. Then the outer surfaces and the outer edges were coated with a mixture of 74% $KNO_3$+20% TSP+6% $NaNO_3$, and subjected to a heat treatment at 380° C. for 25 min for ion exchange. This separation of the ion exchange of the two surfaces allowed a substantial outer-surface potassium spike to be achieved, and high "knee stress" at the bottom of that spike, with less enrichment of the inner surfaces with potassium. The 25-min ion exchange of the outer surface also served to deepen the potassium that was exchanged on the inner surface during the earlier 13-min treatment. It was estimated that the amount of potassium diffused into the glass in 13 min, and deepened for the additional 25 min, should be enough to effectively separate the two tension zones and prevent a crack from passing through the center compression zone. Note that the change in the salt composition for the final step, eliminating the TKP, eliminated the uncertainty of how much of the Na is captured by TKP in the salt.

The so-formed sandwich article (C1+C2) with compressive center region having a breadth of about 10-15 microns, two tension zones adjacent on either side of it, and additional compressive regions on the outer sides, was subjected to a stress measurement using a scattered-light polariscope (SCALP), to obtain an estimate of the depth of compression (DOC) and the peak tension (PT) in the tension regions. The sample was rotated multiple times with respect to the laser beam of the SCALP instrument, to obtain an average of many measurements, and so to reduce the significant error due to laser speckle and also other errors due to scattering from the surfaces and the adhesion. The DOC evaluated at 225+/−25 micrometers, while the PT was between 73 MPa and 56 MPa from the average of PT in the two tension zones as reported by SCALP in multiple scans. The value 73 MPa was obtained from the average peak values of multiple SCALP fits in the tension zone in the half that is in contact with the prism of the SCALP instrument, while 56 MPa was obtained in the same way from the tension zone in the half not in contact with the prism.

The uncertainty in these values is to a large degree due to the relatively large laser beam size (estimated at around 150-200 microns at various depths in the sample), substantially larger than the thickness of the high-compression potassium-enriched regions on the inner side of the substrates. In addition, scattering from the glue in the mid-section of the sandwich may reduce the accuracy of the retardation values obtained in the vicinity of this core region, and the peak tension values occur fairly close to this region.

Fitting a full model profile consistent with the ion-exchange process to retardation data in the depth range of 150-560 micrometers, considered reliably far enough away from the scattering regions, gave a peak tension (PT) of 56 MPa. There is up to 3 MPa uncertainty in this PT estimate caused by some uncertainty in the precise angle at which the laser beam enters the glass. Based on these characterization measurements, it is estimated that the peak tension (PT) in each of the tension zones is between about 53 MPa and 70 MPa for this example.

The sandwich was fractured on a quasi-static frangibility tester, where a flaw deeper than the DOC was generated by slow penetration with a sharp tungsten-carbide tip. When a deep enough flaw was introduced to form a crack in the tension zone, the crack extended several mm on either side of the penetrating tip, then self-terminated without reaching the edges of the sample. The tungsten-carbide tip was then driven deeper, with the conical shape of the tip driving additional tension in the crack tips, which helped to drive further sideways (i.e. lateral) extension of the crack, and the crack then extended across the full diameter of the sample. The sample fractured without bifurcations, and only the plate in contact with the tungsten-carbide tip fractured. The other half of the sandwich remained whole, without any cracks.

In comparison, single-sheet samples ion exchanged in a bath having 85% $NaNO_3$ and 15% $KNO_3$ to a center tension of 72-74 MPa showed frangibility (crack bifurcations) for thicknesses exceeding 1.1 mm. Furthermore, after being subjected to a second short ion exchange for 30 min at 380° C. in a bath having 6% $NaNO_3$ and 94% $KNO_3$ by weight, the tendency to bifurcate increased, even though the central tension (which in this case is also the peak tension) did not increase. In particular, samples with thickness 1.0 mm and above all showed tendency to bifurcate after such a second step. Based on the observed frangibility at a CT of 72 MPa with 1.0 mm thickness, it was estimated that the frangibility limit for the similarly spiked profile (with a 30-min second step with 6% $NaNO_3$ forming a surface CS of about 900 MPa) was at a CT of about 63 MPa or lower for a single-sheet, single-tension-zone 1.3 mm glass article. Furthermore, crack self-termination has not previously been observed at relatively high CT levels, such as the estimated 53-70 MPa for the 1.3 mm sandwich based on the SCALP measurements. The demonstrated profile and laminated article showed at least a benefit of crack self-termination when compared to a single-tension, single-sheet article of the same thickness and peak tension. In addition, if the peak tension exceeded 63 MPa, the demonstrated article also showed non-frangible fracture above the normal frangibility limit for a single-tension-zone article.

Example 4—Crack Self-Termination

The self-termination of cracks observed with the above described 2×0.65 mm sandwich is a highly desirable effect at relatively high peak tensions, such as 50 MPa and higher. While the disclosure should not be bound by any theory, it is believed that this regime was achieved due to the supporting role of the twin-sheet on the other side of the central compression zone. Indeed, that sheet did not have flaws extending to its tension zone, and did not separate as a result of the sideways (i.e. lateral) crack extension in the upper sheet. Hence, it is believed that the intact lower sheet constrained the upper sheet to a state of stress almost identical to the state where the upper sheet was not fractured. This allowed the flaw extension to self-terminate once it reached the area where the spatially localized extra tension caused by the introduction of a sharp object was weak or negligible.

Hence, besides the non-frangible aspects disclosed herein, another embodiment comprises a glass-based article having a central region of compression between two tension zones, where self-termination of crack sideways (i.e. lateral) extension in at least one of the tension zones is possible. In particular, such self-termination is possible at levels of peak tension in the tension zone significantly higher than 20 MPa (at tension levels below about 20 MPa self-termination is possible for single-sheet, single-tension-zone glass). Self-termination of the crack extension at peak tension exceeding 50 MPa was observed, which is substantially higher than 20 MPa.

Local minor variations in the thickness, density, or stress in the glue layer after the bonding of the two sheets comprising the sandwich article may have contributed to self-termination of a crack originated with a sharp tungsten-carbide tip and extending sideways (i.e. laterally) inside the upper tension zone. In particular, the crack was observed to extend in a slightly curved trajectory rather than following a straight line, which is believed to be due to interaction with the local variations of stress, thickness, or density of the adhesive layer or its surroundings. The variations in stress or thickness of the adhesive layer may have caused spatial variations in the tension of the nearby tension zone, which could result in the observed crack bending, and may have ultimately contributed partially to the observed crack self-termination. Hence, another embodiment comprises a glass-based article having a compressive region separating two tension regions, where a crack spreading sideways (i.e. laterally) from an origin in one of the tension regions follows a path that is not straight but has at least two bends occurring between the origin and the crack tip or end, said bends curving in opposite directions to form a wave-like shape. More specifically, each bend contributes a total change in crack direction of at least 20 degrees by absolute value, and the directions of such bends alternate.

Examples 5-7: 2×0.75 mm Compound Articles

Example 5

Asymmetric strengthening of the building sheets of the compound glass article was achieved using all-liquid salt mixtures that were free of solid phases at the ion-exchange temperature. To avoid sheet deformation in shapes other than spherical, the sheets were prepared in disk shape. Furthermore, 0.75 mm thick sheets were used to obtain peak tension substantially above the frangibility limit of 1.5 mm thick single-tension-zone, single-sheet glass-based articles. Based on our experimental studies with the same glass (SUBSTRATE 4), the frangibility limit for 1.5 mm single-sheet glass is about 58-59 MPa. A reference-example 1.5 mm thick 50 mm×50 mm glass article of SUBSTRATE 4 glass ion exchanged at 390° C. in 85% NaNO$_3$ for 6 hours developed a peak tension of 63.6 MPa and showed a frangible pattern upon fracture, with many (more than 10) crack bifurcations over the sample area.

In several examples of making a laminated "sandwich" article, the 0.75 mm thick sheets for a 1.5-1.6 mm thick sandwich were strengthened chemically in the following way. First, the outer surface was subjected to long ion exchange at 390° C. for 8.7 hours by 1-sided immersion in a molten mixture of 85% NaNO$_3$ and 15% NaNO$_3$ by weight. The 1-sided immersion was achieved by placing the glass discs on a stainless-steel net such that the discs lay horizontally on the net, then carefully lowering the net onto a shallow bath of the molten salt mixture, such that the discs lay in the salt in a way that the upper surface of the discs was not immersed, and the upper surface of the discs was at approximately the same height as the level of the molten salt. Toward the end of ion exchange, the disks acquired a small spherical curvature, with the convex side down into the salt. At this time, the upper edges of the discs may have been lifted slightly above the salt level, but remained wet with molten salt. A second strengthening step formed ion-exchange-induced compression on the intended inner surface of the glass sheets (the concave sides). This was accomplished by spray-coating a near-saturated solution of KNO$_3$ on said intended inner surface, then heat treating the dried glass sheets at 390° C. for about 13 min. The salt from the first ion-exchange step had been cleaned prior to treatment of the inner surface. After the ion exchange of the inner surface, the samples were washed of salt and cleaned thoroughly. In one example (sandwich made from 0.75 mm parts CC1 and CC2) a third ion exchange was performed on the outer surface without any heat treatment. The third step was performed where the outer surface was coated with a mixture rich in KNO$_3$ and having substantially less NaNO$_3$, to achieve a high surface CS "spike" while also attaining a knee stress $CS_k$ greater than about 80 MPa, but preferably greater than 90 MPa, greater than 100 MPa, and more preferably greater than 120 MPa. In the tested examples, the outer surface was coated with a mixture of 90% KNO$_3$+5% TSP+5% NaNO$_3$ by weight, and heat-treated at 390° C. for 30 min.

After the final asymmetric strengthening of each of the individual glass sheets, sandwich articles with divided tension zones were obtained by applying clear epoxy (Loctite EA9017) on the intended inner surfaces of each of two asymmetric glass sheets, then squeezing said sheets against each other in a vice for about 1 hour and 45 mins to flatten them and bond them together. The resulting sandwich glass articles had a divided tension zone, a central compression layer having a peak compressive stress between about 200 MPa and 700 MPa, reduced from about 1200 MPa by the 25-30 min heat-treatment occurring during the final outer-surface ion exchange, and a total thickness between about 5 microns and 25 microns, excluding the thickness of the glue which varied somewhat by location and may have reached up to 130 microns in the thickest areas as signified by the total thickness of up to 1.63 mm in certain locations of the sandwich. The peak tension in the tension zones was estimated between about 74 MPa and 76 MPa. Comparative single-sheet glass articles with an undivided tension zone and with thicknesses of 1.3 mm, 1.5 mm, and higher, having such high peak tension are quite frangible. On the other hand, the first sandwich made in this way showed a relatively low level of bifurcation in the top sheet that was fractured by poking with a sharp tungsten-carbide tip. The crack did not penetrate into the bottom sheet, which remained intact. The degree of fragmentation of the top sheet was similar to the degree of fragmentation observed in the single-sheet 1.5 mm SUBSTRATE 4 glass that had a much lower CT of 63.6 MPa, at least 10 MPa lower than that of said sandwich article. The stress profile of the sandwich had a depth of compression (DOC) estimated at 0.265+/−0.015 mm, representing no less than 0.145 (e.g., 14.5%) of the full thickness including the glue in the middle. Since the glue does not play a significant role in the force balance, its thickness can be excluded from the upper estimate of the ratio DOC/t (depth of compression over total thickness) for this example, which then comes at 0.187. The knee stress $CS_k$ at the bottom of the potassium spike was estimated in the range 160-210 MPa using the shift between the critical-angle positions of the TM and TE light in prism-coupling angular spectroscopy. The DOL of the potassium spike (DOW was about 11 microns, and the surface compressive stress was 800 MPa.

Example 6

To eliminate frangibility, two other discs (parts BB1 and BB2) were heat-treated at 380° C. for 20 min after the full 3-step asymmetric strengthening identical to that of the above described pair that showed some level of bifurcations after forming the sandwich. The two sheets BB1 and BB2 were then bonded together with clear epoxy (Loctite EA9017) and squeezed in a vice overnight. The following morning the tension was measured using SCALP and the measurements showed a slight decrease in peak tension by about 2-4 MPa compared to the pair without heat treatment, with peak tension was estimated at about 72 MPa. The heat treatment also resulted in a slight increase of the depth of compression (DOC) on the outer sides of the sheets, and a slight narrowing of the tension zone in each of the sheets BB1 and BB2. Some parameters of the resulting stress profile include a DOL of the potassium-enriched surface spike at about 11.8 microns, surface compressive stress in the range of 600-660 MPa, and a knee stress $CS_k$ of about 140-160 MPa at the bottom of the spike.

The so-prepared sandwich was subjected to fracture using the sharp tungsten-carbide tip. The upper sheet in contact with the tip developed a single crack that stretched over the entire diameter without bifurcating. The absence of bifurcations is regarded as indicative of a non-frangible condition for the article. Thus, a non-frangible glass article has been demonstrated with significantly higher peak tension (by 20-30%) and tensile-strain energy (by 40-100%) than the single-tension-zone non-frangible articles. Furthermore, the crack that formed in the upper sheet did not penetrate through the dividing central region into the tension zone of the lower sheet, which is a substantial additional benefit.

Example 7

Two other sheets (DD1 and DD2) of 0.75 mm thick glass were asymmetrically strengthened using the above described three ion exchange steps using liquid salt mixtures, but the glass article was heat treated at 380° C. for 30 min after the first (8.7 hour) step to help increase the depth of compression (DOC) and slightly decrease the peak tension of the final sandwich article. Then, the inner surfaces were spray-coated with an aqueous solution of $KNO_3$, dried, and the samples were heat-treated at 390° C. for 13 min, including the warm-up of the sample, to chemically strengthen the inner surfaces with potassium ion exchange. Finally, the outer surface of each part was coated with a mixture of 90% $KNO_{3+5}$% TSP+5% $NaNO_3$ by weight, using spray-coating of an aqueous solution, and after drying each part was heat treated for 25 min at 380° C., including the warm-up of the samples and salt in the oven which occurred over approximately the first 5 min. The two asymmetric sheets DD1 and DD2 were then bonded on their inner sides using the optically clear epoxy (Loctite EA9017) in a vice and held until the bond was cured.

The so-prepared glass sandwich with compression core region was subjected to a sharp contact with the tungsten-carbide tip. A single crack formed, restricted to only the upper sheet. The crack did not penetrate through the compressive central region of the sandwich, and did not bifurcate. The sandwich was considered non-frangible. The peak tension estimate by SCALP measurement was in the range of 72-74 MPa. The stress profile on one side of the sandwich showed a surface CS of 911 MPa, the surface spike extending to a depth of 12.2 microns (spike depth-of-layer, or $DOL_{sp}$), and a knee stress $CS_k$ of about 180-200 MPa at a depth approximately equal to $DOL_{sp}$. The profile readings on the other side were surface CS of 957 MPa, $DOL_{sp}$ of 12.0 microns, and $CS_k$ of about 190 MPa. The depth of compression (DOC) is estimated at 0.275+/−0.015 mm, representing no less than 0.157 (e.g., 15.7%) of the full thickness including the glue in the middle. Since the glue does not play a significant role in the force balance, its thickness can be excluded from the upper estimate of the ratio DOC/t (depth of compression over total thickness) for this example, which then comes at 0.193. This upper estimate for the present example is not a principal limitation. A higher ratio of DOC/t could be obtained by using a longer first-step ion exchange and a longer heat treatment, for example.

Example 8: Draw Process Formation

In another aspect of the disclosure, the glass article having a compressive-stress region separating two regions of tensile stress is obtained by a fusion-draw-lamination process or by lamination and re-draw process. In particular, in the fusion-draw example a fusion-draw cascade forms a three-layer sheet, where the inner layer is of a glass composition that has a smaller coefficient of thermal expansion than the outer layers. During the cooling of the three-layer sheet on the fusion draw, the difference in thermal expansion causes the middle layer to experience biaxial compression in the directions parallel to the plane of the large sheet, while the outer layers experience biaxial tension in the same directions. The thickness of the central compressive-stress layer is between about 1 micron and about 500 microns, and represents a fraction of the total thickness of the stack that is between 0.0012 and about 0.212. Specifically for device cover-glass applications, it may be preferable that the central compressive-stress layer be between about 2 microns and about 150 microns in thickness, and represent a fraction of the total thickness of the cover-glass 3-layer stack that is between about 0.0025 and 0.12. More preferably, the central compressive layer is between 5 microns and 60 microns thick, and represents between 0.5% and 10% of the thickness of the 3-layer stack. The central region has compressive biaxial stress that is between about 20 MPa and about 5000 MPa, but preferably between about 35 MPa and 1400 MPa prior to any additional chemical or otherwise strengthening of the glass article. The outer regions have a combined total thickness that is at least about 78% of the total thickness of the glass laminate, have relatively low tension between about 1 MPa and about 50 MPa, preferably less than about 40 MPa, depending on the amount of compressive stress and the relative thickness of the compressive layer, and the thickness of said outer regions. Thicker outer regions generally will tolerate lower tension. A central compressive region having relatively high compressive stress and relatively high thickness (such as greater than 5% of the total thickness) will impose higher tension in the tension regions to balance the stresses. For best results in handling and machine-processing of said laminate glass articles, it is preferred that the tension in the outer tensile layers be lower than about 35 MPa, preferably lower than about 30 MPa. Further, it may be preferred that the tension in said tension layers be lower than about $$\frac{25 \text{ MPa}}{\sqrt{t_{clad}}},$$

and for high-throughput machine processing lower than about $$\frac{20 \text{ MPa}}{\sqrt{t_{clad}}}, \frac{15 \text{ MPa}}{\sqrt{t_{clad}}},$$

or even better $$\frac{10 \text{ MPa}}{\sqrt{t_{out}}},$$

where $t_{clad}$ is the thickness of said cladding tension layer in mm. In an example, a laminated glass article having a central region between 0.005 mm and 0.2 mm in thickness, and outer tension regions each having thickness of 0.35 mm, is preferred to have tension substantially below about 42 MPa in each of the tension regions prior to chemical or thermal strengthening, preferably below about 34 MPa. This three-layer laminate provides a stress profile having two tension zones, outer compression layer with large DOC, and high surface CS, by using relatively easy low-cost conventional ion-exchange methods, such as 1-step and two-step immersion ion exchange, known in the art for Li-free glasses such as SUBSTRATE 3, and Li containing glasses such as SUBSTRATE 4. Hence, the three-layer laminate with a central compression region and outer tension regions conforming to the above restrictions represents a disclosure having great benefit for process yields, process simplicity, and good repeatability of the final parts after full strengthening. This laminate structure can also be strengthened by thermal strengthening, or by a step of thermal strengthening followed by one or more steps of chemical strengthening.

While it is generally preferred in some embodiments that the compression in the central layer of the laminate pre-form exceed 35 MPa or 45 MPa, in other embodiments it may be preferred that the compression in said central layer exceed 100 MPa, 150 MPa, or 200 MPa, as the subsequent tempering by thermal or chemical methods will reduce the compression of the central layer of the final strengthened article relative to the compression of the central layer of the pre-form. The extra compression is particularly more valuable for cases where the peak tension of the strengthened final article substantially exceeds the frangibility limit of a single-sheet, single-tension zone article that is as thick as the laminate. For example, when the peak tension of a tension zone in a strengthened final article is about 70 MPa or higher, it may be preferable that the biaxial compressive stress of the laminate pre-form central layer exceed 120 MPa, preferably 150 MPa, and more preferably 200 MPa. The thinner the central compressive layer, the higher the preferred level of compressive stress. In an example, the central layer may be only 5-10 microns thick, and have compressive stress between about 120 MPa and 800 MPa. The stresses in the laminate pre-form may be generated not only by CTE mismatch of the glass sheets, but also by other effects such as inter-diffusion of somewhat mobile ions between the sheets during the lamination process. The peak compression in the central layer of the fully strengthened laminate cover-glass article can be a net combination of multiple effects that occur during lamination and subsequent chemical or other strengthening.

Example 9: CTE Mismatch for the Fusion-Drawn Laminated Sample

To generate through CTE mismatch the required biaxial compressive stress of the central region that is preferably greater than 35 MPa, 45 MPa, 100 MPa, 150 MPa, or 200 MPa using a fusion-draw process according to some embodiments, the at least two glasses forming the core and the cladding layers should differ adequately in coefficient of thermal expansion (CTE). For example, if the glasses have a Young's modulus around 70 MPa and a softening point near 800° C., the glass of the central compressive region should have an average CTE that is lower than the average CTE of the cladding glass layers by more than about $9 \times 10^{-7}$ per ° C., preferably by more than about $1.5 \times 10^{-6}$ per ° C., and most preferably by more than about $2 \times 10^{-6}$ per ° C. These figures describe the difference in CTE averaged over the temperature range from 25 to 625° C. As some of the stress may be relaxed during the cooling of the glass, it is further preferred that the CTE of the core sheet be lower than that of the cladding by more than about $2 \times 10^{-6}$ per ° C. on average over said temperature range 25-625° C. Furthermore, when the thickness of the central compressed-glass layer (core layer) is less than about 7% of the total thickness of the laminated stack, it may be preferred that CTE of the core layer be lower than the CTE of the cladding layer by at least $2.0 \times 10^{-6}$ per ° C., $2.5 \times 10^{-6}$ per ° C., or even $3 \times 10^{-6}$ per ° C. on average over said temperature range 25-625° C.

In some cases it may be challenging to form a high-quality flat 3-layer laminate sheet by fusion when the CTE mismatch of the glasses comprising the laminate is very large. Hence, it may be preferable that the CTE difference between the core layer and a cladding layer not exceed $9 \times 10^{-6}$ per ° C., $7 \times 10^{-6}$ per ° C., $5 \times 10^{-6}$ per ° C., $4 \times 10^{-6}$ per ° C., or $3 \times 10^{-6}$ per ° C. on average over the temperature range 25-625° C.

In one specific example, a fusion laminate is formed having as the core a sheet of SUBSTRATE 2, and as the cladding SUBSTRATE 3. The core layer has a CTE of about $7.58 \times 10^{-6}$ per ° C. in the temperature range 25-300° C., while the cladding layer (SUBSTRATE 3) has a CTE of about $8.69 \times 10^{-6}$ per ° C. in the temperature range 25-300° C. At temperatures above 300° C. the CTE of both glasses increases significantly, and the difference in CTE is believed to further increase.

The thermal expansion of SUBSTRATE 3 glass between 25° C. and 625° C. is about 5750 parts per million (ppm), which averages about 9.583 ppm/° C. The total thermal expansion of SUBSTRATE 2 over the same temperature range 25-625° C. is about 5045 ppm, which averages at about 8.408 ppm/° C. The average CTE difference over the temperature range 25-625° C. is about 1.175 ppm/° C. Based on this, and a Young's modulus for both glasses at about 67 GPa, with stress relaxation during the fast cooling after lamination being negligible, the glass pair generates a strain differential of 5750 ppm-5045 ppm=705 ppm, and a stress differential of 47.2 MPa. This glass pair thus demonstrates according to embodiments of the disclosure that the core layer has peak tension exceeding 35 MPa as long as the thickness of the core does not exceed about 25% of the total thickness of the laminate. Furthermore, the peak compression of the core sheet of the laminate pre-form made of SUBSTRATE 3 cladding and SUBSTRATE 2 core exceeded 40 MPa as long as the thickness of the core sheet is less than about 15% of the total thickness of the laminate. Furthermore, the peak stress of the core sheet of the laminate pre-form exceeds 44 MPa if the thickness of the core sheet is less than about 6.78% of the total thickness of the laminate. Furthermore, the peak stress of the core sheet of the laminate pre-form exceeds 45 MPa if the thickness of the core sheet is less than about 4.6% of the total thickness of the laminate. If cooling at the end of lamination is not very fast, the stress differential can be diminished slightly due to stress relaxation at temperatures above 500° C. On the other hand, with very fast cooling, a slightly higher stress differential of about 50 MPa may be possible when laminating these two glasses, if the stress relaxation at temperatures above 625° C. is largely avoided by the fast cooling.

The CTE difference averaged over the temperature range 25-625° C. is about $1.175 \times 10^{-6}$ per ° C. and allows achieving core compression of about 45 MPa, greater than the required at least 35 MPa of compressive stress in the core region when the core is a small fraction of the total thickness, such as 5% or less. In a specific embodiment using this glass pair with SUBSTRATE 2 core and SUBSTRATE 3 cladding the core layer having a 30-40 micron thickness, and the two cladding layers each having a thickness of 0.48 mm. The total thickness of the laminate is 1 mm. The laminate sheet is then cut to size to match the target in-plane shape of the cover-glass article, and ion exchanged using a two-step process, wherein the first step is performed in a bath having about 40-43% $NaNO_3$ and 57-60% $KNO_3$ by weight, at 460° C. for 15 to 25 hours. After the article is washed, a second "spike" step is performed in a second salt bath having preferably 97% $KNO_3$ or more, and 0-3% $NaNO_3$ by weight, preferably 0.5-1% $NaNO_3$. This second ion-exchange step is performed by immersion in said second salt bath at 390° C. for 8-20 min, preferably 12-15 min. Using these conditions, if a single-sheet glass article (not laminate) of SUBSTRATE 3 with a thickness of 1 mm were made, it would have a stress profile having a large DOC exceeding about 105 microns, large surface CS, and CT peak tension at the center exceeding about 40 MPa, and would be frangible, especially for the longer first-step ion exchange times. It would tend to form multiple crack bifurcations upon fracture, particularly when the first-step ion exchange time exceeds about 16 hours. The article would be more and more frangible as the first ion-exchange duration is increased from 15 hours toward 25 hours. On the other hand, the laminate article having a compressive layer in the center is non-frangible, has a substantially lower tendency to form bifurcations, especially at the shorter ion-exchange times in the range of 14-20 hours. The Young's modulus of the two glasses is about 67 GPa, and with the core representing 3-4% of the thickness, the laminate article after fast cooling obtains a compressive stress in the core of the pre-form that is higher than about 44 MPa. After the chemical strengthening the core compression reduces to fall in the range 0-4 MPa, although in some cases the compression values in the center may turn slightly negative, meaning that the core may be in slight tension after the chemical strengthening, such as <10 MPa tension, or >(−10 MPa) compression. The residual compression after chemical strengthening (or in some cases near-zero compression or very low tension in the single-digit MPa) is enough to help reduce the tendency for fast crack branching observed with the single-glass article strengthened using the same process.

Other potential examples of good pairing (in some cases maybe better than the above example) include using SUBSTRATE 1 as the core, and SUBSTRATE 4 as the cladding, or any of SUBSTRATE 1 and SUBSTRATE 2 as the core, and Commercially available glass B as the cladding. Commercially available glass B comprises (in mol %): 64.48% $SiO_2$, 7.00% $B_2O_3$, 13.92% $Al_2O_3$, 14.04% $Na_2O$, 0.49% $K_2O$, 0.04% $SnO_2$, 0.004 $TiO_2$, and 0.03% $Fe_2O_3$. Furthermore, it may be possible to use Commercially available glass A as the cladding (as defined above) and Commercially available glass C as the core. Commercially available glass C comprises (in mol %) 69.18% $SiO_2$, 8.52% $Al_2O_3$, 13.93% $Na_2O$, 1.18% $K_2O$, 0.19% $SnO_2$, 0.54% CaO, 6.46% MgO, and 0.005% $TiO_2$.

A practical aspect of one or more embodiments of the present disclosure accounts for the fact that it is relatively straightforward to form a laminate pre-form without flaws at the interfaces between the three glass layers comprising the pre-form, once the sophisticated fusion-draw equipment is fully engineered and operational, while on the other hand it is challenging to keep exposed surfaces of separate glass sheets free of any flaws during fabrication and strengthening that require some handling of the individual sheet layers (in the case where a laminate sandwich article is formed by bonding of separate glass sheets). Therefore, in practice strengthened glass articles having a compressive central layer that is less than about 10 micron in thickness may preferably be made by using the fusion-draw-laminate pre-form as the starting article prior to exterior glass strengthening, while articles having a central compressive region thicker than about 10 microns may be made by both fusion-draw-laminate pre-form, and by bonding of separate glass sheets into a laminate (sandwich).

In other embodiments of the disclosure, the laminate pre-form is formed by a process other than fusion draw. More specifically, in some embodiments, the laminate pre-form is formed by slot-draw, re-draw, or by a rolling process. It is likely that the laminates formed by these different methods will have higher cost and poorer quality of the outer surfaces than the fusion-draw laminate articles, but the slot-draw and the rolling platforms would also allow forming laminates from a variety of glass compositions that are challenging for fusion-draw, such as glasses having liquidus viscosity below about 300 kilopoise, and especially below about 200 kilopoise. In an example, 3 sheets of 2 different glasses, one for the core, and the other for the two cladding layers, are stacked together, heated up, and run through a rolling platform that makes the stack thinner and bonds the stack. The glasses are heated to above the softening point right at the input of the rollers. The rollers thin the glass laminate. In some embodiments, it is preferred that each of the cladding glass sheets be at least twice as thick as the core sheet, preferably 4-40 times thicker than the core sheet. Furthermore, in some embodiments, it is preferred that the cladding sheets have some excess thickness to allow polishing after the rolling, as the rolled glass surface is usually of poorer quality than the outer surfaces of a fusion glass sheet.

In another embodiment of the disclosure, the two sheets of a two-sheet sandwich need not be made of the same glass and need not have the same thickness. Similarly, in the case of a three-layer laminate pre-form, the two cladding layers need not be made of the same glass, and need not have the same thickness.

Finished-Part Profile Feature:

According to one or more embodiments, a common feature of the laminate pre-form and the finished part is that there is a sudden or steep change in stress at the interface between the different-composition glass sheets forming the laminate. If there were no diffusion of ions across the interfaces during the lamination process, the stress change would be sudden, a jump representing a change of 35 MPa or more, preferably 40 MPa, 50 MPa, 100 MPa, or more. With diffusion across the interfaces, this stress change could occur over a distance of 1-15 microns. After chemical strengthening, the compressive stress in the core sheet may no longer be 35 MPa or more, but the stress change at the interface will be 35 MPa or more, preferably 40 MPa or more, 50 MPa or more, or 100 MPa or more. Hence, in one aspect of the disclosure, the laminate cover-glass article exhibits a steep change of stress exceeding 35 MPa, 40 MPa, 44 MPa, 50 MPa, 100 MPa, or more, occurring over a narrow spatial region (usually thinner than 15 microns) where two different glass sheets are fused together, and where one or more chemical components of the glasses may experience a concentration shift representing the transition from one of the glass sheets of the laminate to another. The extent of the narrow spatial region is often less than about 15 microns, but may in some rare cases be wider. This feature is common to the pre-form and the chemically strengthened laminate structure, and can be measured by stress profile measuring methods such as refracted-near-field (RNF), scattered-light polarimetry in some cases if the instrument has adequate spatial resolution such as 10 micrometers, polarized microscope or Mach-Zender interferometry, also as long as adequate spatial resolution below about 10 microns is achieved.

Example 10: 2×0.4 mm Compound Articles

In an example, two sheets of glass composition: 57.43 mol % $SiO_2$, 16.10 mol % $Al_2O_3$, 17.05 mol % $Na_2O$, 2.81 mol % MgO, 0.003 mol % $TiO_2$, 6.54 mol % $P_2O_5$, and 0.07 mol % $SnO_2$, made in accordance with U.S. Pat. No. 9,156,724 and each having a thickness of 0.4 mm, were used to form a 0.8 mm thick compound article. It is noted that in this example, the glass composition does not contain lithium.

Each of the two 0.4 mm thick sheets was core-drilled to form a disc with diameter between 36 mm and 37 mm. The so formed discs were labeled "B1" and "B2". One side of each sheet was designated as "outer", and the other side as "inner". In a first ion exchange step, the outer side was ion exchanged in a bath having about 40 wt % $NaNO_3$ and about 60 wt % $KNO_3$ at 460° C. for 15 hours. The one-sided immersion in the molten nitrate salt bath was achieved by disposing the sample on top of a stainless-steel mesh in such a way that the bottom surface of the sample facing the mesh was wet with liquid, while the upper surface remained dry. The level of the molten nitrate salt bath was prepared to be just enough to immerse the mesh, but not fully immerse the glass discs. The discs were loaded in the bath together with the mesh, and also extracted from the bath by removing the mesh together with the sample. This procedure helped keep the upper surface of the samples from contacting the molten salt bath. The first step resulted in a deep potassium distribution on the outer side of the discs. The depth of the potassium distribution exceeded 170 μm. Performing the same type of ion exchange on a "witness" sample by full immersion resulted in a surface CS of 212 MPa for a 0.4 mm sample, and 273 MPa on a 0.8 mm sample. The difference in CS between the two thicknesses is mainly due to the higher CT developed in the 0.4 mm article, and, to a lesser degree, the slightly higher depth of ion exchange for the 0.4 mm sample which further increases CT. Due to slightly different thermal history in the fusion-draw process, the diffusion in the 0.4 mm glass is slightly faster than that in the 0.8 mm sample. The DOL (depth of layer) calculated by using an assumption that the index profile is a linear truncated profile, was 172 μm. With this type of DOL, some K ions from the ion exchange had already reached the mid-thickness of 0.2 mm for the 0.4 mm samples. The 0.4 mm witness sample developed a center tension (CT) of 110-115 MPa and was non-frangible. The 0.8 mm witness sample developed a DOL of 159 μm, a CT of 54 MPa and was also non-frangible.

In a second step, the discs B1 and B2 were completely immersed in a molten salt bath having about 40 wt % $NaNO_3$ and about 60 wt % $KNO_3$, at 390° C. for 15 minutes. As a result of this short ion-exchange step, the outer-side potassium distribution had negligible change. On the inner side a potassium distribution was formed with a DOL of 10.3 μm, and substantially the same surface concentration as on the outer side. A witness sample with a thickness of 0.4 mm was symmetrically ion exchanged at 390° C. for 15 minutes in the same molten salt bath developed a surface CS of 334 MPa and a DOL of 10.3 μm.

In a third step, a high-CS surface spike was added on the outer sides of the discs B1 and B2. The outer sides were subjected to a one-sided ion exchange at 390° C. for 13 minutes in a molten salt bath of $KNO_3$ without added $NaNO_3$. As in step 1, the "inner" sides were kept dry by selection of the molten salt bath level and using the steel mesh to lower the samples into the bath. This step formed a surface spike with surface CS exceeding 800 MPa, and DOL of 13 μm to 14 μm.

A similar CS spike was formed on the surface of the 0.4 mm and 0.8 mm symmetrically ion-exchanged witness samples, where the parts were ion-exchanged by full immersion at 390° C. for 13 minutes in the same molten salt bath after having undergone the long 15-hour first-step ion exchange. The addition of the spike raised the CT of the 0.8 mm witness sample from about 54 MPa to about 63.7 MPa. The frangibility factor $K_f$ increased to 1.382, indicating that the 0.8 mm witness sample was frangible. The depth of compression on the 0.8 mm witness sample decreased from 112 μm to 106.8 μm as a result of the spike addition.

After the first step of asymmetric ion-exchange, each of the two discs B1 and B2 developed warp that was concave when viewing the disc from the "outer side". The warp direction did not change until the final step of laminating (gluing) the two discs together, at which point the warp was substantially eliminated. The split-tension-zone compound article was formed by applying an optically clear adhesive (Loctite brand EA9017 epoxy) on the "inner" sides, then pressing the inner sides against each other, squeezing the so-formed 2-disc sandwich in a vice, and holding it squeezed together in the vice for about 1 hour and 45 minutes.

The two-disc sandwich was then subjected to a frangibility test. A sharp tungsten-carbide tip was slowly inserted into the outer side of the top disc of the sandwich, in the geometrical center of the circular outline of the disc, until a crack originated in the location of the tip contact. The crack propagated sideways diametrically across the disc, forming two branches without forming any bifurcation. Furthermore, in the depth direction the crack was not able to penetrate through the central compression portion disposed in a narrow region surrounding the mid-thickness of the sandwich. In comparison, the 0.8 mm thick witness sample having a similar deep portion of the profile and similar surface spike, was frangible.

In this example, the inner compression region that split the tension zone of the compound article in half had a maximum CS above 200 MPa and below 300 MPa, and a total breadth of about 20 μm, ignoring the thickness of the epoxy, said epoxy not having similar compressive stress as the ion-exchanged portions of said inner compression region. This example illustrates that a central compressive region with peak CS of less than 300 MPa and breadth of about 20 μm is adequate to prevent a crack from penetrating through the thickness of the compound article, and is thus adequate to serve the purpose of effectively splitting the tension zone and substantially raising the amount of stored strain energy without rendering the compound article frangible, thus allowing the production of non-frangible parts with a higher strength.

The contribution of the "inner" CS spike to the peak tension of the compound article was equal to about 3.6 MPa for the 0.8 mm thick compound article. This was added to the 63.7 MPa of reference CT obtained on the 0.8 mm thick witness sample not having the inner CS spike. Hence, the compound sample had a peak tension PT of at least 67.4 MPa, but was strictly non-frangible. The DOC of the compound sample was similar to the DOC of the 0.8 mm thick witness sample, about 107 μm.

It will be apparent to those skilled in the art that various modifications and variations can be made without departing from the spirit or scope of the disclosure.

What is claimed is:

1. A glass-based article having a surface and a thickness (t), the glass-based article comprising:
   an outer region extending from the surface to a depth of compression, wherein the outer region is under a neutral stress or a first compressive stress;
   a core region under a second compressive stress, the second compressive stress defining a compression peak having a maximum compression value and a maximum width at zero stress in a range of from 1 micrometer to 200 micrometers, wherein the compression peak comprises an increasing stress region such that all points of the increasing stress region comprise a tangent having a value that is in a range of from 20 MPa/micrometer to 200 MPa/micrometer and a decreasing stress region such that all points of the decreasing stress region comprise a tangent having a value that is in a range of from −20 MPa/micrometer to −200 MPa/micrometer; and
   an intermediate region disposed between the surface and the core region, wherein the intermediate region is under a tensile stress.

2. The glass-based article of claim 1, wherein the compression peak has a maximum width at zero stress in a range of from 5 micrometers to 200 micrometers.

3. The glass-based article of claim 1, wherein the compression peak has a maximum width at zero stress in a range of from 10 micrometers to 40 micrometers.

4. The glass-based article of claim 1, wherein the outer region is under the first compressive stress defining a surface compressive stress.

5. The glass-based article of claim 4, wherein the compression peak has a maximum compressive stress that is at least 50% of the surface compressive stress.

6. The glass-based article of claim 5, wherein the compression peak has a maximum compressive stress that is at least 70% of the surface compressive stress.

7. The glass-based article of claim 4, wherein the surface compressive stress is in a range of from 300 MPa to 1200 MPa.

8. The glass-based article of claim 7, wherein the surface compressive stress is in a range of from 600 MPa to 1000 MPa.

9. The glass-based article of claim 7, wherein the compression peak has a maximum compressive stress that is at least 30% of the surface compressive stress.

10. The glass-based article of claim 9, wherein the compression peak has a maximum compressive stress that is at least 50% of the surface compressive stress.

11. The glass-based article of claim 1, wherein outer region is under the first compressive stress and extends to a depth of compression (DOC) where the glass-based article has a stress value of zero, the DOC being in a range of 0.05·t and 0.30·t.

12. The glass-based article of claim 11, wherein the tensile stress in the intermediate region has a maximum tensile stress absolute value less than an absolute value of the maximum compression value of the compression peak.

13. The glass-based article of claim 1, wherein the thickness (t) of the glass-based article is in a range of 0.1 mm to 3.0 mm.

14. The glass-based article of claim 1, wherein the glass-based article has a stress profile that results in stored tensile energy in the glass-based article, such that when damage is introduced into a surface of the glass-based article, the stress profile reduces crack bifurcations compared to a glass-based article having the same amount of stored tensile energy and not having the compression peak.

15. The glass-based article of claim 1, wherein, the core region includes a mid-point between the surface and a second surface opposite the surface of the glass-based article.

16. The glass-based article of claim 1, comprising an alkali aluminosilicate glass.

17. The glass-based article of claim 1, wherein the glass-based article is formed from a glass-based composition comprising $Li_2O$ in a range of 0.1 mol % and 20 mol %.

18. The glass-based article of claim 1, wherein the glass-based article is formed from a glass-based composition comprising $B_2O_3$ in a range of 0.1 mol % and 10 mol %.

19. The glass-based article of claim 1, wherein the glass-based article is formed from a glass-based composition comprising $P_2O_5$ in a range of 0.1 mol % and 10 mol %.

20. The glass-based article of claim 1, wherein the glass-based article is formed from a glass-based composition that is substantially free of $K_2O$.

21. A device comprising:
   a housing having front, back, and side surfaces;
   electrical components that are at least partially inside the housing;
   a display at or adjacent to the front surface of the housing; and a cover substrate disposed over the display, wherein at least a portion of at least one of the cover substrate and the housing comprises the glass-based article of claim 1.

* * * * *